United States Patent
Kim et al.

(10) Patent No.: US 11,810,003 B2
(45) Date of Patent: Nov. 7, 2023

(54) LEARNING TREE OUTPUT NODE SELECTION USING A MEASURE OF NODE RELIABILITY

(71) Applicants: NATIONAL UNIVERSITY CORPORATION, IWATE UNIVERSITY, Iwate (JP); AISing LTD., Tokyo (JP)

(72) Inventors: Chyon Hae Kim, Iwate (JP); Akio Numakura, Iwate (JP); Yasuhiro Sugawara, Iwate (JP); Junichi Idesawa, Tokyo (JP); Shimon Sugawara, Tokyo (JP)

(73) Assignees: NATIONAL UNIVERSITY CORPORATION, IWATE UNIVERSITY, Morioka (JP); AISing LTD., Tokyo (JP)

( * ) Notice: Subject to any disclaimer, the term of this patent is extended or adjusted under 35 U.S.C. 154(b) by 767 days.

(21) Appl. No.: 16/494,198

(22) PCT Filed: Mar. 14, 2018

(86) PCT No.: PCT/JP2018/010089
§ 371 (c)(1),
(2) Date: Sep. 13, 2019

(87) PCT Pub. No.: WO2018/168971
PCT Pub. Date: Sep. 20, 2018

(65) Prior Publication Data
US 2020/0005164 A1    Jan. 2, 2020

(30) Foreign Application Priority Data
Mar. 15, 2017 (JP) .................. 2017-050459

(51) Int. Cl.
*G06N 5/022* (2023.01)
*G06N 20/00* (2019.01)
(Continued)

(52) U.S. Cl.
CPC ............... *G06N 5/022* (2013.01); *G06N 5/01* (2023.01); *G06N 5/04* (2013.01); *G06N 20/00* (2019.01)

(58) Field of Classification Search
CPC .......... G06N 5/022; G06N 20/00; G06N 5/04; G06N 5/003; G06N 5/01; G06N 7/01
See application file for complete search history.

(56) References Cited

U.S. PATENT DOCUMENTS

| | | |
|---|---|---|
| 2003/0163437 A1 | 8/2003 | Lee |
| 2005/0144147 A1* | 6/2005 | Lee ..................... G06K 9/6282 706/12 |

FOREIGN PATENT DOCUMENTS

JP    2016-173686 A    9/2016

OTHER PUBLICATIONS

Woods et. al., "Combination of multiple classifiers using local accuracy estimates", 1997, IEEE Transactions on Pattern Analysis and Machine Intelligence, vol. 19 No. 4, pp. 405-410 (Year: 1997).*

(Continued)

*Primary Examiner* — Ann J Lo
*Assistant Examiner* — Leonard A Sieger
(74) *Attorney, Agent, or Firm* — Myers Wolin, LLC

(57) ABSTRACT

An information processing device generates a prediction output corresponding to input data. The information processing device includes input-node specification processor circuitry, based on the input data, configured to specify input nodes corresponding to the input data and each located on a corresponding one of layers from beginning to end of the learning tree structured, reliability-index acquisition proces- (Continued)

sor circuitry configured to acquire a reliability index obtained through the predetermined learning processing and indicating prediction accuracy, output-node specification processor circuitry, based on the reliability index acquired by the reliability-index acquisition processor circuitry configured to specify, from the input nodes corresponding to the input data, an output node that is the basis of the generation of a prediction output, and prediction-output generation processor circuitry configured to generate a prediction output.

10 Claims, 23 Drawing Sheets

(51) Int. Cl.
  *G06N 5/04* (2023.01)
  *G06N 5/01* (2023.01)

(56) References Cited

OTHER PUBLICATIONS

Liu et al., "FP-ELM: An online sequential learning algorithm for dealing with concept drift", 2016, vol. 207, pp. 322-334 (Year: 2016).*
Domingos et. al., "Mining High-Speed Data Streams", 2002, Proceeding of the Sixth ACM SIGKDD International Conference on Knowledge Discovery and Data Mining, v 2002, pp. 1-10 (Year: 2002).*
Last, "Online classification of nonstationary data streams", 2002, Intell. Data Anal., vol. 6, pp. 129-147 (Year: 2002).*
Anagnostopoulos et. al., "Information—Theoretic Data Discarding for Dynamic Trees on Data Streams", 2013, Entropy, vol. 15(12), pp. 5510-5535 (Year: 2013).*

Zhang, "Flexible and Approximate Computation through State-Space Reduction", 2013, arXiv, v1301.7418, pp. 531-538 (Year: 2013).*
Pyeatt et. al., "Decision Tree Function Approximation in Reinforcement Learning", 2001 (Year: 2001).*
Gama et al., "Learning Decision Trees from Dynamic Data Streams", 2005, Journal of Universal Computer Science, vol. 11 No. 8 (2005), pp. 1353-1366 (Year: 2005).*
Gama et al., "Learning with Local Drift Detection", 2006, Lecture Notes in Computer Science, Aug. 2006 (Year: 2006).*
Written Opinion issued by the International Searching Authority for corresponding International Patent Application No. PCT/JP2018/010089, dated Jun. 19, 2018 with full English translation attached.
Kim et al., Error-based prediction algorithm for a dynamical system learning tree, Information Processing Society of Japan, Research Report, Mathematical Modeling and Problem Solution (MPS), vol. 2017-MPS-112, No. 25, pp. 1-5, [Online] dated Feb. 20, 2017. With English translation attached.
Kim et al., Error-based prediction algorithm for a dynamical system learning tree, Information Processing Society of Japan, Research Report, Mathematical Modeling and Problem Solution (MPS), vol. 2017-MPS-112, No. 25, pp. 1-5, [Online] dated Feb. 20, 2017.
International Search Report and Written Opinion issued by the Japan Patent Office for corresponding International Patent Application No. PCT/JP2018/010089, dated Jun. 19, 2018, with partial English translation of the ISR.
Extended European search report with supplementary European search report and the European search opinion issued by the European Patent Office for corresponding European Patent Application No. 18767958.4-1203, dated Dec. 22, 2020.
Frias-Blanco et al., "Online adaptive decision trees based on concentration inequalities", Knowledge-Based Systems 104 (2016) pp. 179-194.
Gama et al., "Learning with Local Drift Detection", LIACC—University of Porto, University of Aveiro, ADMA 2006, LNAI 4093, pp. 42-55, 2006.

* cited by examiner

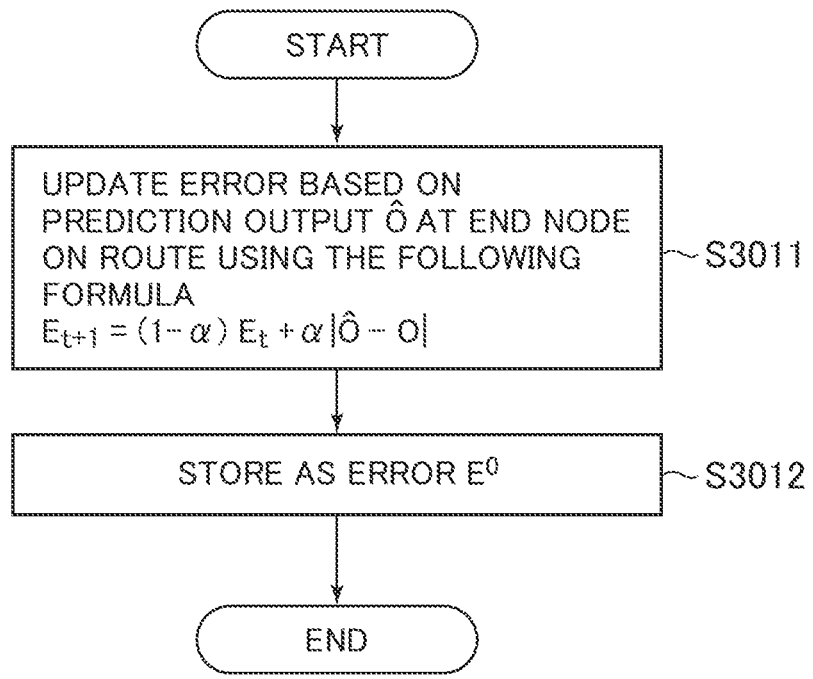
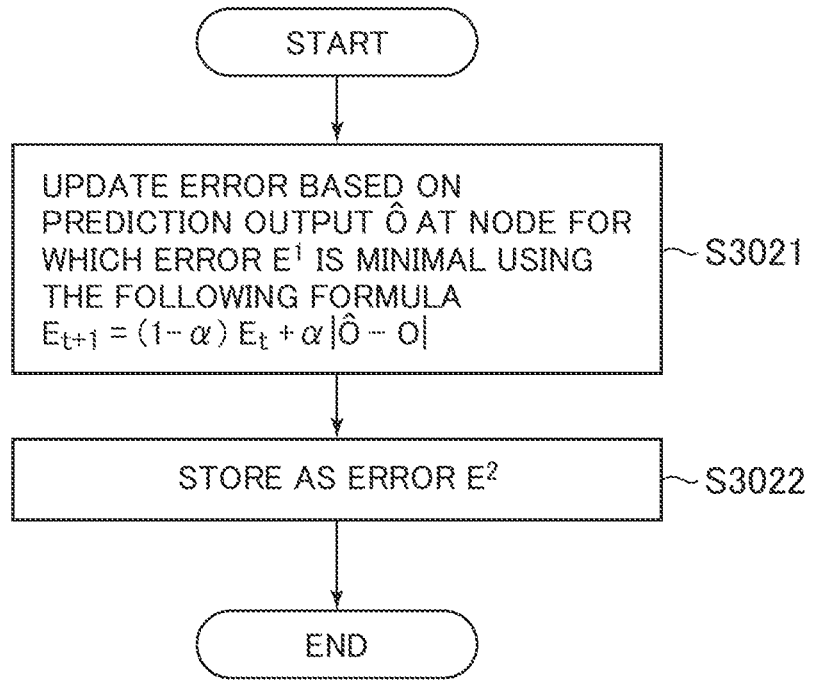

FIG. 23B
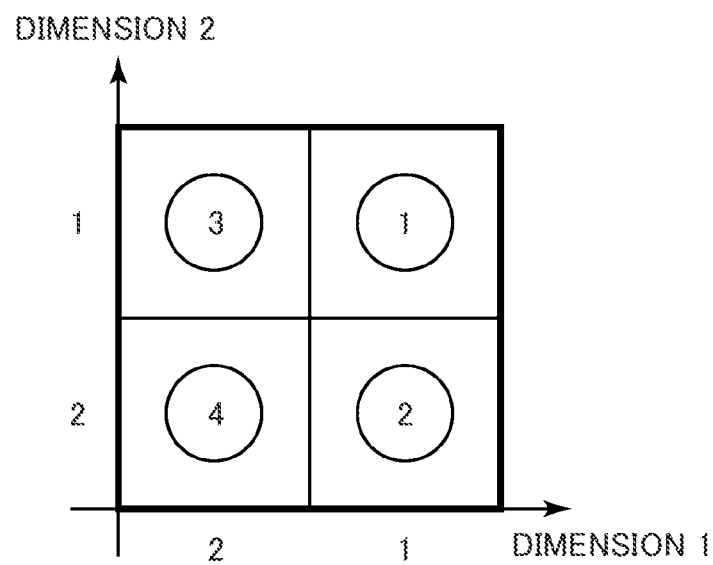
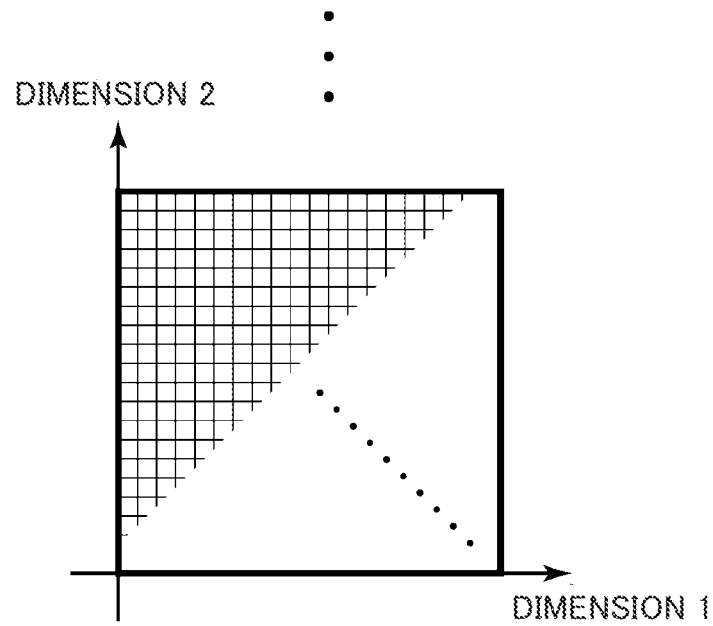

LEARNING TREE OUTPUT NODE SELECTION USING A MEASURE OF NODE RELIABILITY

CROSS REFERENCE TO RELATED APPLICATIONS

This application is a National Stage entry of International Patent Application No. PCT/JP2018/010089, filed Mar. 14, 2018 and claims priority to Japanese Patent Application No. 2017-050459, filed on Mar. 15, 2017, the entire contents of each are herein incorporated by reference.

TECHNICAL FIELD

The present invention relates to an information processing device, a method, an IC chip that perform predetermined learning processing, or an information processing device, an information processing method, an information processing program, and a learned model that generate a prediction output corresponding to predetermined input data based on the result of the learning processing. In particular, the present invention relates to an information processing device, a method, a program, an IC chip, and the like that perform learning/prediction processing using a tree structure.

BACKGROUND ART

Recently, new frameworks of learning methods utilizing a learning tree structure have been proposed by the inventors of the present application and the like. The relevant learning methods using the learning tree structure has attracted high attention because of its ease of additional learning, its faster computation speed, its efficient of the reduction of a memory usage amount, and the like (Patent Literature 1).

The outline of a prediction method using a learning device that utilizes a learning tree structure will be described referring to FIGS. 23 and 24.

In FIG. 23A, there is illustrated the structure of a learning tree in the relevant learning method, and in FIG. 23B, there is illustrated an image of state spaces corresponding to the relevant structure. As is obvious from FIG. 23A, the structure of the learning tree is configured by arranging nodes each of which is associated with a corresponding one of hierarchically divided state spaces and which extend from an uppermost node (a beginning node or a root node) to lowermost nodes (end nodes or leaf nodes) in a tree shape or a lattice shape. Here, FIG. 23A illustrates an example case in which, in a learning tree having N layers, d dimensions, and n divisions, N is equal to two, d is equal to two, and n is equal to two, and numbers 1 to 4 appended to four end nodes on a first layer of the learning tree illustrated in FIG. 23A are each associated with a corresponding one of four state spaces illustrated in FIG. 23B.

A method for predicting an output corresponding to new input data using a learned learning tree will be described using FIG. 24. FIGS. 24A and 24B respectively illustrate a configuration of a learning tree that is in a state in which the learning has proceeded to a certain degree, and state spaces corresponding to the learning tree. As is obvious from FIGS. 24A and 24B, in a state space corresponding to an end node denoted by "4" on the second layer when seen from an end node denoted by "4" on the first layer, the learning has proceeded to a degree, and as shown by an arrow, a state transition vector that is an output corresponding to the relevant state space is already obtained. Further, in a state space corresponding to an end node denoted by "4" on the second layer when seen from an end node denoted by "1" on the first layer, the learning has also proceeded to a degree, and as shown by an arrow, a state transition vector that is an output corresponding to the relevant state space is already obtained. Note that the state transition vector is a vector having been calculated by the arithmetic mean of state transition vectors encompassed in a state space corresponding to the same node.

Here, as illustrated in FIG. 24, input data that is to belong to a state space corresponding to a node denoted by "2" on the second layer when seen from a node denoted by "1" on the first layer is newly input, data associated with the relevant state space does not yet exist, and thus, as a result, the prediction output is calculated based on a node that corresponds to the node denoted by "1" on the first layer and that is an utmost end node among existing learned nodes.

In this way, according to a conventional learning structure, even when learning is not yet sufficiently performed on a particular state space, prediction processing is performed using a node that is located at an utmost end position among upper nodes and that encompasses the relevant state space, and thus, at least rough prediction processing can be performed, that is, a generalization function can be achieved.

CITATION LIST

Patent Literature

Patent Literature 1: Japanese Patent Laid-Open No. 2016-173686

SUMMARY OF INVENTION

Technical Problem

However, the state spaces are divided into a larger number of smaller state spaces as the location of a layer is lower, and thus, there is a property that, inevitably, the lower the location of a layer is, the smaller the number of pieces of learned data encompassed in each state space is. Further, there is a tendency that, the lower the location of a layer is, a node is more likely to be influenced by noise included in to-be-learned data. Thus, particularly, in a state in which learning does not yet proceed sufficiently, a situation in which the reliability of a prediction output based on an end node is not necessarily sufficient has sometimes occurred.

The present invention has been made under the above-described technical background, and an object of the present invention is to achieve highly accurate prediction processing even when to-be-learned data includes noise or the like.

Any person skilled in the art could easily understand further other objects and operation and effect of the present invention by referring to the following description of the present specification.

Solution to Problem

The above-described technical problem can be solved by an information processing device having a configuration described below.

That is, an information processing device according to the present invention is an information processing device that generates a prediction output corresponding to input data, based on a learned model that is obtained by causing a learning model having a tree structure configured by a plurality of hierarchically arranged nodes each associated with a corresponding one of hierarchically divided state spaces to learn a predetermined set of pieces of to-be-learned data, and comprises an input-node specification unit that, based on the input data, specifies input nodes corresponding to the input data and each located on a corresponding one of layers from beginning to end of the learning tree structure; a reliability-index acquisition unit that acquires a reliability index obtained through the predetermined learning processing and indicating prediction accuracy; an output-node specification unit that, based on the reliability index acquired by the reliability-index acquisition unit, specifies, from the input nodes corresponding to the input data, an output node that is a basis of the generation of a prediction output; and a prediction-output generation unit that generates the prediction output, based on the to-be-learned data that is included in the state spaces that corresponds to the output node specified by the output-node specification unit.

According to the above configuration, based on the reliability index acquired through learning processing, a higher reliable node can be selected to generate a prediction output, and thus, more highly accurate prediction processing can be achieved.

Further, in the information processing device according to the present invention, the reliability index may comprise first errors each generated at a corresponding input node among the input nodes based on a difference between an output corresponding to the input data and a prediction output based on the learned data included in the state spaces that corresponds to the corresponding input node, and the output-node specification unit may specify, as the output node, a node which is among the input nodes and for which a corresponding first error among the first errors is minimal.

According to the above configuration, as a result, a node for which an error relative to a prediction output has been small in the result of the learning having been performed so far is selected, and thus, a higher reliable node can be selected as an output node that is the basis of the generation of the prediction output, thereby enabling the achievement of more highly accurate prediction processing.

Moreover, in the above information processing device, the each first error may be updated by performing a weighting addition using a forgetting coefficient $\alpha$ ($0<\alpha<1$) on the each first error having been already obtained through the predetermined learning processing and an absolute value of a difference between the output corresponding to the input data and a prediction output based on the learned data included in the state spaces that corresponds to the corresponding input node.

According to the above configuration, when learning processing is performed, an adjustment as to the degree of the reflection of newly added learning data, that is, an adjustment as to the degree of forgetting of existing learning data, can be made.

Further, in the above information processing device, the reliability index may comprise an end prediction error obtained based on a difference between an output corresponding to the input data and a prediction output at an end node among the input nodes, and a second error that, based on first errors each generated at a corresponding input node among the input nodes based on a difference between the output corresponding to the input data and a prediction output based on the learned data included in the state spaces that corresponds to the corresponding input node, is generated based on a difference between the output corresponding to the input data and a prediction output at an input node which is among the input nodes and for which a corresponding first error among the first errors is minimal, and the output-node specification unit may make a comparison in a magnitude relation for the end prediction error and the second error, and may specify, as the output node, the input node for which the corresponding first error is minimal when the second error is smaller than the end prediction error, otherwise, may specify, as the output node, the end node among the input nodes.

According to the above configuration, when it is more appropriate to make a prediction at an end node, the end node is specified as an output node, while, when it is more appropriate to make a prediction at a node other than the end node, a node for which an error from a prediction output is the smallest in the results of learning having been performed so far is specified as the output node, and thus, more highly accurate prediction processing can be achieved.

Moreover, in the above information processing device, the reliability index may be generated for each of the input nodes under a predetermined condition by referring to a prediction output at the each input node or a node among the input nodes that is located on a layer among the layers that is lower than the each input node, and the output-node specification unit may specify the output node based on the reliability index having been generated for the each input node.

According to the above configuration, when the reliability of a node on each of layers of a learning tree is determined, a prediction output at nodes on lower layers are referred, and thus, when an output node is specified, it can be determined to which of the nodes on a route of the lower layers the downward movement of the node is to be made, thereby enabling the achievement of more highly accurate prediction processing.

Further, in the above information processing device, the reliability index may comprise first errors each generated at a corresponding input node among the input nodes based on a difference between an output corresponding to the input data and a prediction output based on the learned data included in the state spaces that corresponds to the corresponding input node, and third errors each generated at a corresponding input node among the input nodes under a predetermined condition based on a difference between the output corresponding to the input data and a prediction output at an input node among the input nodes that is located on a layer among the layers that is lower than the corresponding input node, and the output-node specification unit sequentially may make a comparison in a magnitude relation, for each of the input nodes from a beginning node among the input nodes, for a corresponding first error among the first errors and a corresponding third error among the third errors, and may specify, as the output node, a node which is among the input nodes and for which a condition that the corresponding first error is smaller than the corresponding third error is satisfied.

According to the above configuration, when the reliability of a node on each of layers of a learning tree is determined, nodes on lower layers are referred, and thus, in the specification of an output node, it can be determined to which of the nodes on a route of the learning tree the downward movement of the node is to be made, thereby enabling the achievement of more highly accurate prediction processing.

Moreover, in the above information processing device, the reliability index may comprise first errors each generated at a corresponding input node among the input nodes based on a difference between an output corresponding to the input data and a prediction output based on the learned data included in the state spaces that corresponds to the corresponding input node; fourth errors each generated at a corresponding input node among the input nodes under a predetermined condition by referring to a prediction output at the corresponding node or a node among the input nodes that is lower than the corresponding input node; and fifth errors each generated at a corresponding input node among the input nodes under a predetermined condition by referring to a prediction output at the corresponding input node or a node among the input nodes that is lower than the corresponding input node, and the output-node specification unit may sequentially make a comparison in a magnitude relation, for each of the input nodes from a beginning node among the input nodes, for a corresponding fourth error among the fourth errors and a corresponding fifth error among the fifth errors, and when a condition in which the corresponding fourth error is smaller than the corresponding fifth error is satisfied, the output-node specification unit may determine, as a node of interest, a node which is among the input nodes and for which a corresponding first error is smaller than any other first error among first errors at nodes that are among the input nodes and that are lower than or same as the node, while in contrast, when the condition is not satisfied, the output-node specification unit may cause the comparison for the corresponding fourth error and the corresponding fifth error to sequentially proceed to a node among the input nodes that is located on a lower layer among the layers until the condition in which the corresponding fourth error is smaller than the corresponding fifth error is satisfied; the output-node specification unit may determine, for the node of interest, whether or not a condition that a corresponding fourth error among the fourth errors is smaller than a corresponding fifth error among the fifth errors is satisfied, and when the condition is satisfied, the output-node specification unit may specify the node of interest as the output node, while in contrast, when the condition is not satisfied, the output-node specification unit may cause the comparison for the corresponding fourth error and the corresponding fifth error to sequentially proceed to a node among the input nodes that is located on a lower layer among the layers until the condition in which the corresponding fourth error is smaller than the corresponding fifth error is satisfied; and when there does not exist any node for which the condition that the corresponding fourth error is smaller than the corresponding fifth error is satisfied until an arrival at a node among the input nodes that is one layer higher than the end node, the output-node specification unit may specify the end node as the output node.

According to the above configuration, when the reliability of a node on each of layers of a learning tree is determined, nodes on lower layers are referred, and thus, when an output node is specified, it can be determined to which of the nodes on a route of the lower layers the downward movement of the node is to be made, thereby enabling the achievement of more highly accurate prediction processing.

Further, the above output-node specification unit may comprise a highly reliable node specification unit that, based on the reliability index acquired by the reliability index acquisition unit, selects a highly reliable node having highest reliability from among the input nodes corresponding to the input data; a calculation possibility determination unit that determines whether or not a node among the input nodes that is located on a layer among the layers that is one layer lower than the highly reliable node is a node for which appropriate calculation is possible; and a selective output-node specification unit that specifies the highly reliable node as the output node that is the basis of the generation of the prediction output when the node that is located on the layer one layer lower than the highly reliable node is the node for which the appropriate calculation is possible, and specifies the node that is located on the layer one layer lower than the highly reliable node as the output node that is the basis of the generation of the prediction output when, in contrast, the node that is located on the layer one layer lower than the highly reliable node is not the node for which the appropriate calculation is possible.

According to the above configuration, the generation of the prediction output can be performed by selecting a higher reliable node based on a reliability index having been obtained through learning processing and the possibility of appropriate calculation of the reliability index, and thus, more highly accurate prediction processing can be achieved.

Moreover, in the determination by the above calculation possibility determination unit on the possibility of the appropriate calculation, when the total number of pieces of to-be-learned data corresponding to the node that is located on the layer one layer lower than the highly reliable node is larger than or equal to two, it may be determined that the appropriate calculation is possible, and when the total number of the pieces of to-be-learned data corresponding to the node that is located on the layer one layer lower than the highly reliable node is one, it may be determined that the appropriate calculation is impossible.

According to the above configuration, it can be expected that a higher reliable node is selected to generate a prediction output, and thus, more highly accurate prediction processing can be achieved.

Further, the present invention can be also viewed as an information processing device that mainly performs learning processing. That is, the information processing device is an information processing device that performs predetermined learning processing, based on a learning model having a tree structure configured by a plurality of hierarchically arranged nodes each associated with a corresponding one of hierarchically divided state spaces, and comprises an input-node specification unit that, based on the input data, specifies input nodes corresponding to the input data and each located on a corresponding one of layers from beginning to end of the learning tree structure; and a reliability-index updating unit that, at each of the input nodes, gradually updates a reliability index indicating prediction accuracy based on a difference between an output based on the input data and a prediction output based on previously obtained data.

According to the above configuration, the reliable indexes to determine a node that is to be the basis of the generation of the prediction output can be obtained by gradual learning processing. With this configuration, the information processing device having error resistance can be provided.

Moreover, the present invention can be also viewed as an information processing method. That is, the information processing method is an information processing method for generating a prediction output corresponding to input data based on a learned model that is obtained by causing a learning model having a tree structure configured by a plurality of hierarchically arranged nodes each associated with a corresponding one of hierarchically divided state spaces to learn a predetermined set of pieces of to-be-learned data, and comprises an input-node specification step of, based on the input data, specifying input nodes corresponding to the input data and each located on a corresponding one of layers from beginning to end of the learning tree structure; a reliability-index acquisition step of acquiring a reliability index obtained through the predetermined learning processing and indicating prediction accuracy; an output-node specification step of, based on the reliability index acquired by the reliability-index acquisition unit, specifying, from the input nodes corresponding to the input data, an output node that is a basis of the generation of a prediction output; and a prediction-output generation step of generating a prediction output based on the to-be-learned data that is included in the state spaces that corresponds to the output node specified by the output-node specification unit.

Additionally, the present invention can be also viewed as a computer program. That is, the computer program is a computer program that causes a computer to function as an information processing device that generates a prediction output corresponding to input data based on a learned model that is obtained by causing a learning model having a tree structure configured by a plurality of hierarchically arranged nodes each associated with a corresponding one of hierarchically divided state spaces to learn a predetermined set of pieces of to-be-learned data, and comprises an input-node specification step of, based on the input data, specifying input nodes corresponding to the input data and each located on a corresponding one of layers from beginning to end of the learning tree structure; a reliability-index acquisition step of acquiring a reliability index obtained through the predetermined learning processing and indicating prediction accuracy; an output-node specification step of, based on the reliability index acquired by the reliability-index acquisition unit, specifying, from the input nodes corresponding to the input data, an output node that is a basis of the generation of a prediction output; and a prediction-output generation step of generating a prediction output based on the to-be-learned data that is included in the state spaces that corresponds to the output node specified by the output-node specification unit.

Further, the present invention can be also viewed as an IC chip for information processing. That is, the IC chip is an IC chip that generates a prediction output corresponding to input data based on a learned model that is obtained by causing a learning model having a tree structure configured by a plurality of hierarchically arranged nodes each associated with a corresponding one of hierarchically divided state spaces to learn a predetermined set of pieces of to-be-learned data, and comprises an input terminal to which the input data is input; an input-node specification unit that, based on the input data obtained through the input terminal, specifies input nodes corresponding to the input data and each located on a corresponding one of layers from beginning to end of the learning tree structure; a reliability-index acquisition unit that acquires a reliability index obtained through the predetermined learning processing and indicating prediction accuracy; an output-node specification unit that, based on the reliability index acquired by the reliability-index acquisition unit, specifies, from the input nodes corresponding to the input data, an output node that is a basis of the generation of a prediction output; a prediction-output generation unit that generates a prediction output based on the to-be-learned data that is included in the state spaces that corresponds to the output node specified by the output-node specification unit; and an output terminal from which the prediction output is output.

Moreover, the present invention can be viewed as a learned model. That is, the learned model is a learned model that is obtained by causing a learning model having a tree structure configured by a plurality of hierarchically arranged nodes each associated with a corresponding one of hierarchically divided state spaces to learn a predetermined set of pieces of to-be-learned data, and is configured to allow input nodes corresponding to the input data and each located on a corresponding one of layers from beginning to end of the learning tree structure to be specified based on the input data; allow a reliability index obtained through the predetermined learning processing and indicating prediction accuracy to be acquired; allow an output node that is a basis of a generation of the prediction output to be specified from the input nodes corresponding to the input data based on the reliability index acquired by the reliability-index acquisition unit; and allow the prediction output to be generated based on the to-be-learned data that is included in the state spaces that corresponds to the output node specified by the output-node specification unit.

Advantageous Effect of Invention

According to the information processing device according to the present invention, highly accurate prediction processing can be achieved even when to-be-learned data includes noise or the like.

BRIEF DESCRIPTION OF DRAWINGS

FIG. 8 is a flowchart in relation to the calculation of an error $E^0$.

FIG. 9 is a flowchart in relation to the calculation of an error $E^2$.

FIG. 23B is a description diagram illustrating a structure of a learning tree, and is particularly a diagram illustrating represented state spaces.

DESCRIPTION OF EMBODIMENTS

Figure 1:
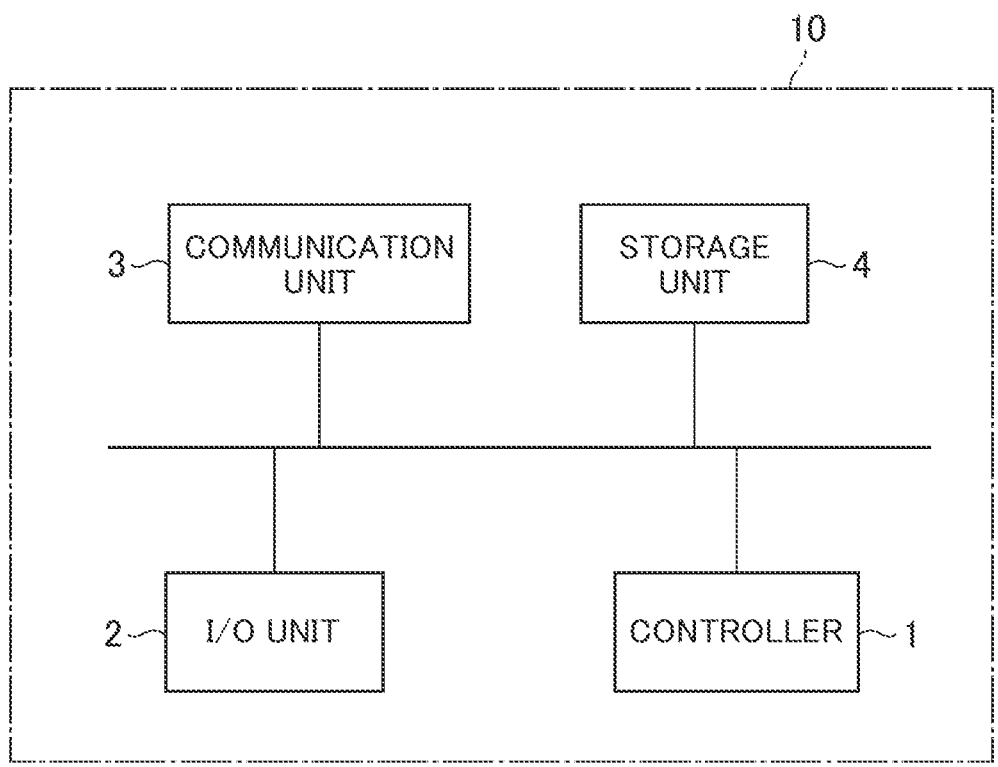
FIG. 1 is a hardware configuration of an information processing device according to a first embodiment.

Hereinafter, one embodiment of an information processing device according to the present embodiment will be described in details referring to the accompanying drawings.

1. First Embodiment

Hereinafter, an information processing device 10 according to a first embodiment will be described referring to FIGS. 1 to 6.

<1.1 Configuration of Information Processing Device>

The hardware configuration of the information processing device 10 according to the first embodiment will be described referring to FIG. 1. The information processing device 10 includes a controller 1, an I/O unit 2 that controls inputs/outputs between the information processing device 10 and external devices, a communication unit 3 that controls wireless or wired communication, and a storage unit device 4, and these components are coupled to one another via a system bus. The controller 1 includes a CPU and the like, and executes various kinds of programs including a learning/prediction algorithm described later. Note that a microprocessor, a microcontroller, or the like may be used instead of the CPU and the like. Further, the storage unit 4 corresponds to various kinds of storage devices including, for example, ROM, RAM, flush memory, a hard disc, and the like, and includes a storage unit 4 that stores, in a temporary or non-temporary manner, pieces of setting information in relation to the structure of learning trees, the other kinds of pieces of setting information, input data, learning data, a computer program including a learning algorithm, and the like.

Note that the configuration of the information processing device 10 is not limited to the configuration of FIG. 1, and can be arbitrarily changed within the range of technical common senses at the time of the application of the present invention. For example, the storage unit 4 may be separately installed as an external storage or the like. Further, the controller 1 may also perform distributed processing or the like in cooperation with controllers or the like included in other information processing devices. Moreover, processing using a virtualization technique, or the like, may be performed.

<1.2 Operation of Information Processing Device>

Next, the operation of the information processing device 10 will be described referring to FIGS. 2 to 4.

<1.2.1 Learning Operation>

Figure 2:
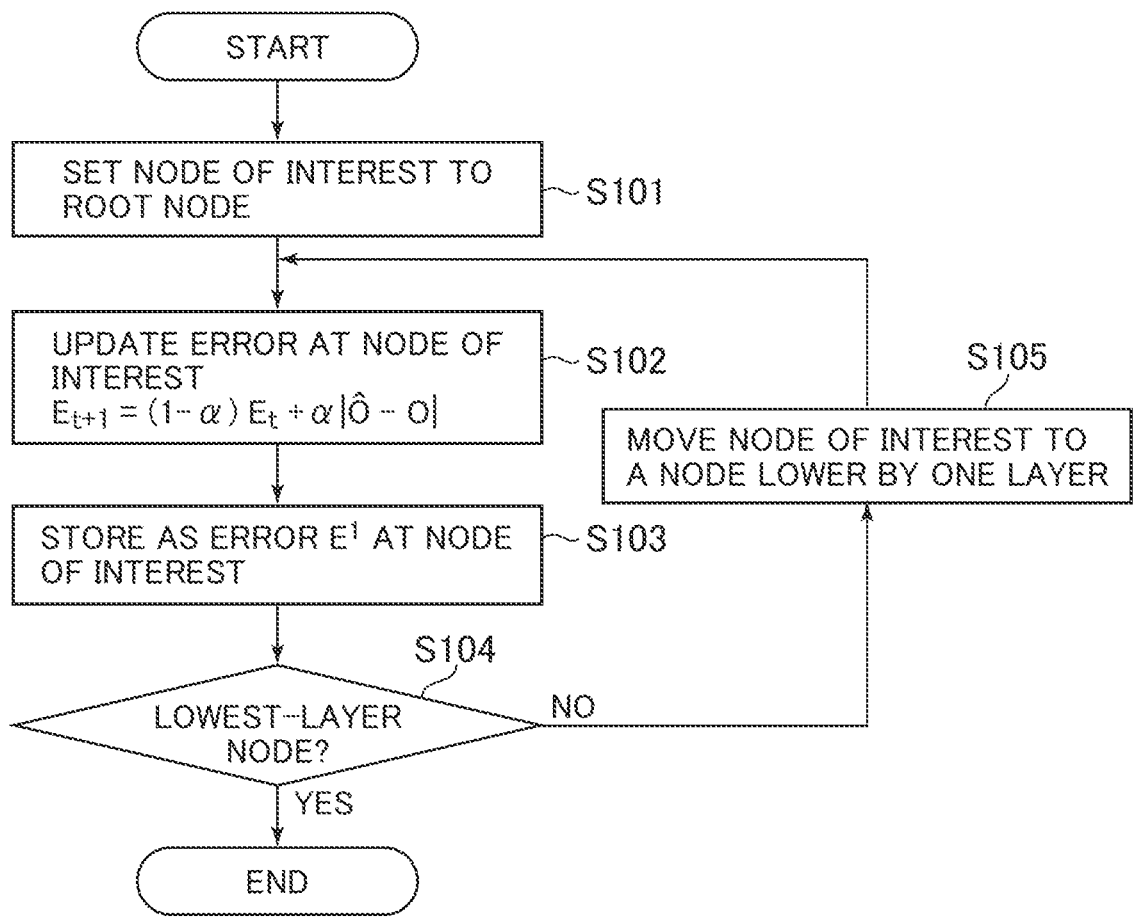
FIG. 2 is a flowchart in relation to the configuration of errors $E^1$.

FIG. 2 is a flowchart at a learning stage in relation to first errors $E^1$ that are reliability indexes at the time when a node that is to be selected as an output node is selected from among individual nodes existing on a route on learning trees corresponding to input data. As a premise, by the input of predetermined data into the information processing device 10, state spaces to which the relevant input data is to belong are specified, and by this specification of the state spaces, one route composed of a plurality of nodes is specified on the learning trees.

Upon start of learning processing on that premise, firstly, a root node is set as a node of interest (S101). Next, a post-learning first error $E^1$ is acquired by performing a weighting addition using a forgetting coefficient α on a first error $E^1$ having been already acquired through previous learnings and the absolute value of the difference between a prediction output based on learning data corresponding to the relevant node of interest and an output O corresponding to the input data (S102). That is, the calculation (updating) of the first error $E^1$ is made using the following formula.

$$E_{t+1} = (1-\alpha)E_t + \alpha|\hat{O}-O|$$

Here, the forgetting coefficient α is a coefficient that plays a role of adjusting the degrees of influences of present data and previous data at the time when learning of new data is performed, and takes a value larger than 0 and smaller than 1. The smaller α is, the more unlikely to be forgotten the previous learning data is, because the learning is performed in a state in which weighting is placed on the previous learning data; while in contrast, the larger α is, the more likely to be forgotten the previous learning data is, because the previous learning data is strongly influenced by newly added learning data. Note that α is a constant number in the present embodiment, but may be configured to be changed in accordance with the proceeding of learning. The calculated first error $E^1$ is stored into the storage unit 4 (S103).

The updating of the first error $E^1$ using the first error $E^1$ at the each node on the route and the prediction output (S102) and the storage of the updated first error $E^1$ into the storage unit 4 (S103) are repeatedly performed (S104 NO) by sequentially moving the node of interest from the root node up to an end node (S105). When the calculations and storages of the first errors $E^1$ up to the end node have been completed (S104 YES), the processing ends.

According to the above configuration, the reliability indexes to determine a node that is to be the basis of the generation of the prediction output can be acquired by gradual learning processing. With this configuration, the information processing device 10 having error resistance can be provided.

<1.2.2 Prediction Operation>

Next, a procedure for performing prediction processing for predicting an output to a predetermined input (a minimal error prediction method) using the learned information processing device 10 will be described in details referring to FIG. 3.

Figure 3:
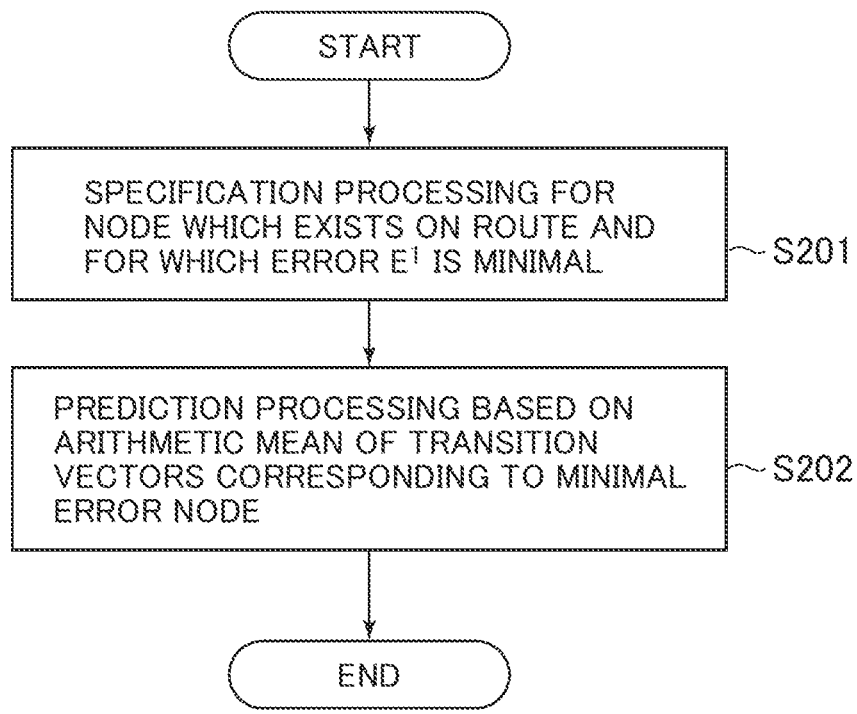
FIG. 3 is a flowchart at the time of the prediction operation of the information processing device according to the first embodiment.

FIG. 3 is a flowchart that describes prediction operation of the information processing device 10. Here, as a premise, by the input of predetermined data into the information processing device 10, state spaces to which the relevant input data is to belong are specified, and by this specification of the state spaces, one route composed of a plurality of nodes is specified on learning trees.

Upon start of the processing on that premise, the first errors $E^1$ each associated with a corresponding one of the nodes on the one route on the learning trees are retrieved from the storage unit 4, and based on the retrieved first errors $E^1$, a node for which a corresponding first error $E^1$ is minimal (a minimal error node) is specified (S201). Thereafter, generation processing for generating a prediction output is performed based on learning data corresponding to the relevant node for which a corresponding first error $E^1$ is minimal (S202). Specifically, in the present embodiment, one state transition vector corresponding to the relevant node is generated by adding and taking the arithmetic mean of state transition vectors that are outputs each associated with a corresponding one of pieces of previous learning data.

Note that, in the present embodiment, the one state transition vector is generated by adding and taking the arithmetic mean of the individual state transition vectors, but the output may be generated using a different method. For example, a distributed matrix may be calculated based on a set of pieces of data corresponding to the same node, and the one state transition vector may be generated based on the relevant distributed matrix.

Figure 4:
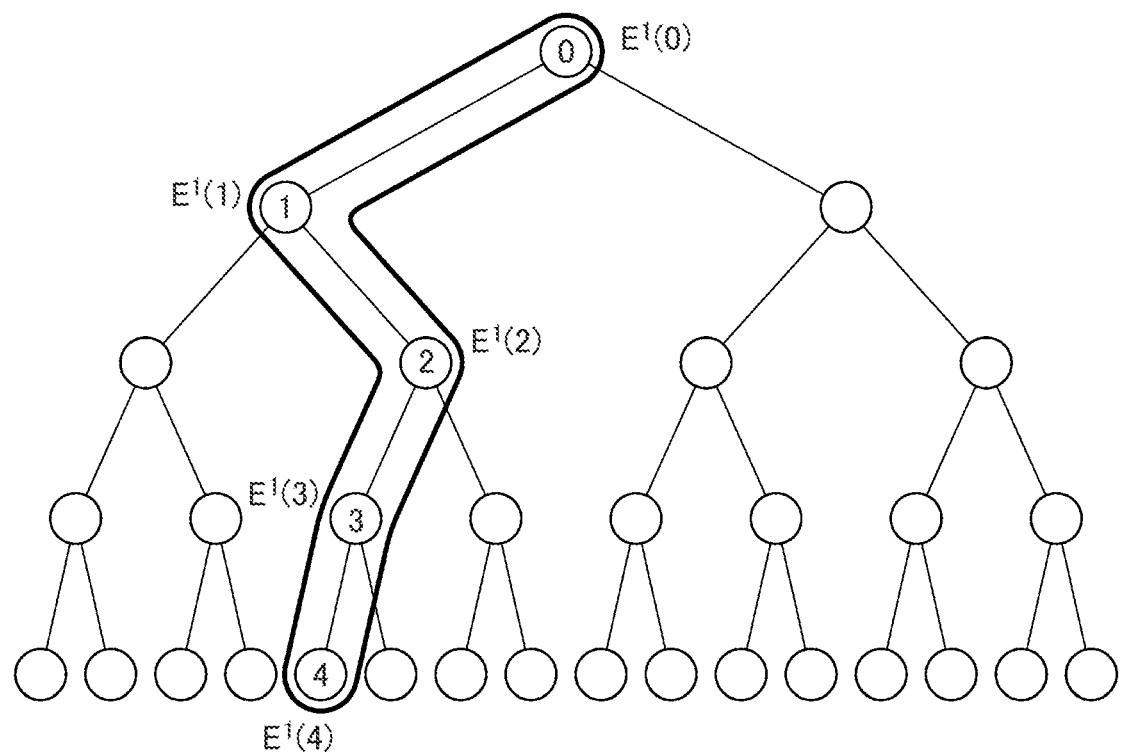
FIG. 4 is a diagram that describes an algorism using a minimal error node.

The procedure of the prediction processing according to the first embodiment (the minimal error prediction method) will be conceptually described referring to FIG. 4. FIG. 4 is a description diagram in relation to an algorithm using the minimal error node, according to the present embodiment. As a premise, by the input of predetermined input data, nodes to which numbers "0" to "4" are appended and which are each enclosed by a thick line are already specified as one route.

The nodes to which the numbers "0" to "4" are appended are respectively associated with first errors $E^1(1)$ to $E^1(4)$ having been acquired by learning. Here, when it is assumed that the first error $E^1(2)$ associated with the node to which the number "2" is appended is smaller than any other first errors $E^1$, the node to which the number "2" is appended is specified as an output node (S201), and a prediction output corresponding to the relevant output node is generated (S202).

According to the above configuration, based on the result of learning, a higher reliable node can be selected as an output node that is the basis of the generation of the prediction output. Accordingly, more highly accurate prediction processing can be achieved.

<1.2.3 Verification Experiment>

In order to show that, according to the learning/prediction method according to the first embodiment, at all times, the influence of the noise is eliminated and, as a result, prediction error can be made smaller than in a case in which prediction using an end node is made, the results of comparison experiments will be described. As inputs, 3000 random input values falling within a range from −3.14 to +3.14 were given, and a waveform resulting from applying, to a sine wave as an output, random noise whose amplitude is approximately 10% of that of the sine wave was learned (one input and one output).

Figure 5A:
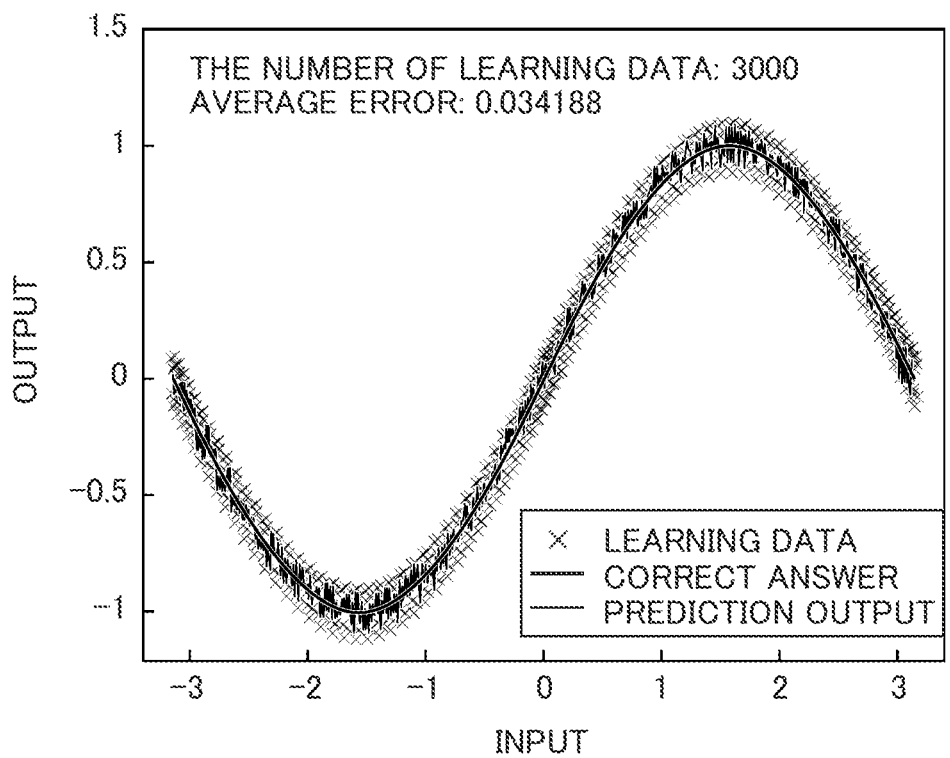
FIG. 5A is a description diagram illustrating a result of learning of a sine wave with noise (a conventional method).
Figure 5B:
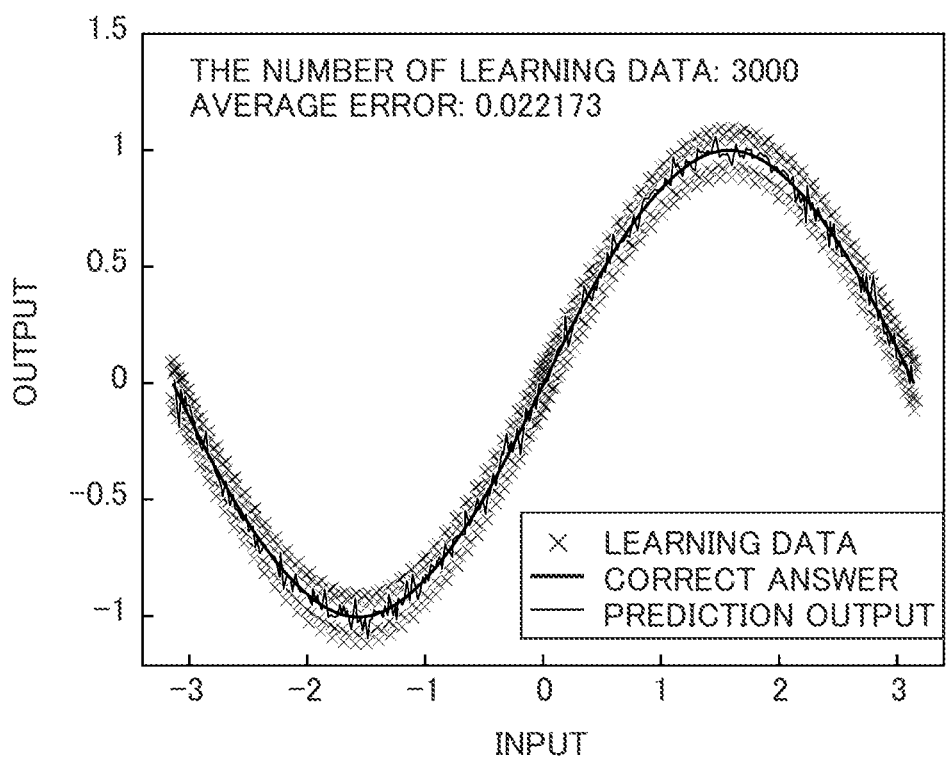
FIG. 5B is a description diagram illustrating a result of learning of a sine wave with noise (a method using a minimal error node).

The experiment results of the comparison experiment are illustrated in FIG. 5. FIG. 5A is an experiment result at the time when an output was predicted by means of the conventional prediction method using an end node, and FIG. 5B is an experiment result at the time when the output was predicted using an output node that was selected by means of the minimal error prediction method according to the present first embodiment. Here, in any one of the experiment results, in FIG. 5, correct answer data (a sine wave with no noise applied thereto), to-be-learned data (a sine wave with noise applied thereto), and prediction outputs are drawn in a superimposed manner.

As is obvious from the comparison between FIG. 5A and FIG. 5B, it can be understood that, according to the minimal error prediction method according to the present first embodiment, as a whole, the prediction results are closer to the correct answer data. When this comparison is made using numerical values, the average error between the prediction outputs and the correct answer data in FIG. 5A is 0.034188; while the average error between the prediction outputs and the correct answer data in FIG. 5B is 0.022173, and from this comparison result, it is found out that, according to the minimal error prediction method according to the first embodiment, the average error of the prediction outputs can be reduced to approximately 64.86% relative to the average error in the conventional method in which an end node is constantly used as an output node. That is, it is confirmed that, according to the minimal error prediction method according to the first embodiment, noise resistance can be improved.

Further, in order to show that, according to the learning/prediction method according to the first embodiment, at all times, the influence of the noise is eliminated and prediction error can be made smaller than in a case in which prediction using an end node is made, the result of different comparison experiments will be further described.

Figure 6A:
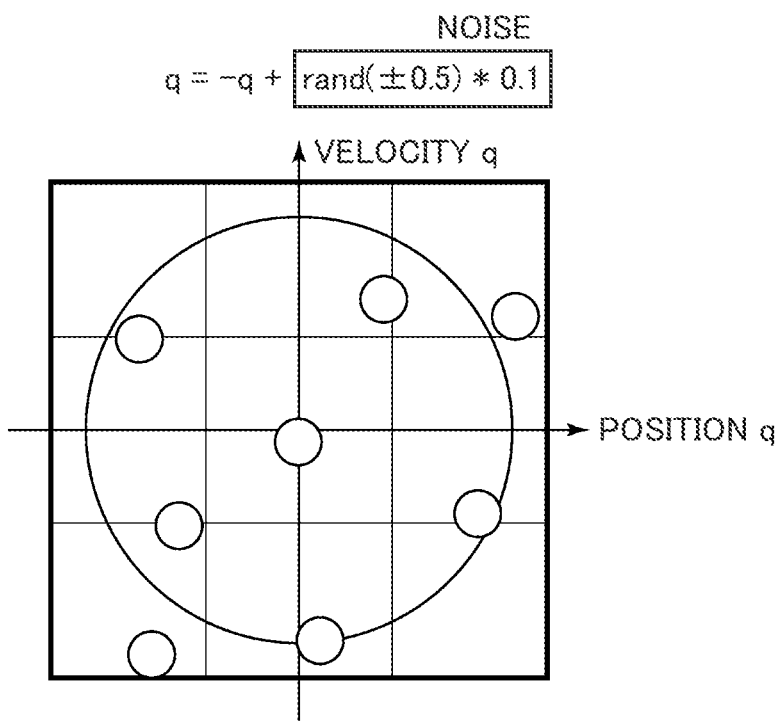
FIG. 6A is a description diagram illustrating a result of learning of a simple harmonic motion with noise, and is particularly a diagram that describes the outline of learning of the simple harmonic motion.

As illustrated in FIG. 6A, in the comparison experiments, a simple harmonic motion with noise added thereto was learned. Specifically, a position q and a velocity were given as inputs, and an acceleration was predicted (two inputs and one output). In the experiments, 10% random noise was added to the position q. The number of pieces of learning data was 30000, the number of pieces of prediction data was 15000, and the number of attempts was 50.

Figure 6B:
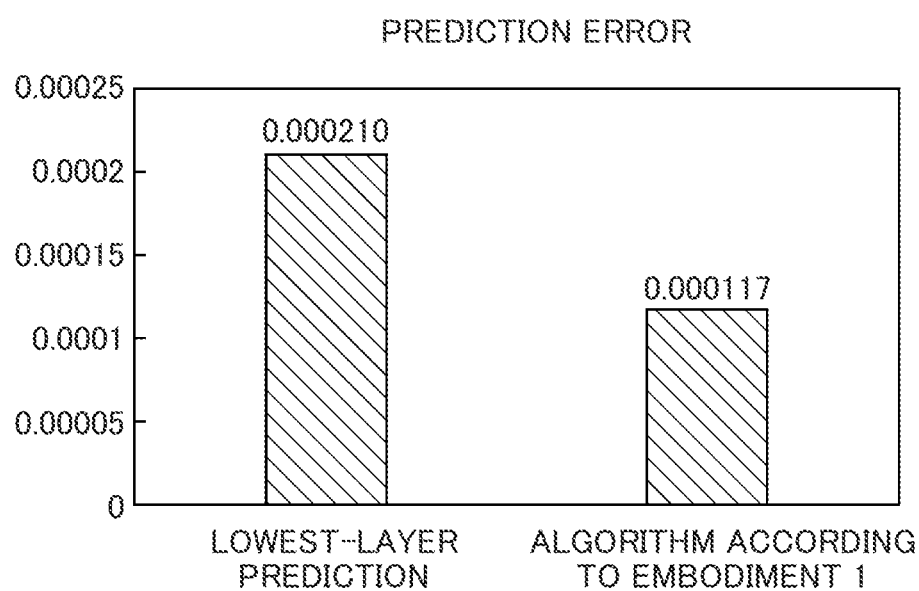
FIG. 6B is a description diagram illustrating a result of learning of the simple harmonic motion with noise, and is particularly a comparison diagram in relation to prediction error.

FIG. 6B illustrates a result of the comparison between an average error at the time when a prediction output was generated using the conventional method in which the lowest layer node, namely, an end node, is constantly used as an output node and an average error at the time when a prediction output was generated using the minimal error prediction method according to the present first embodiment. As is obvious from FIG. 6B, the average error in the conventional method is 0.000210; while the average error in the method according to the present first embodiment is 0.000117, and it is found out that the average error of the prediction outputs can be reduced to approximately 55.78% relative to the average error in the conventional method in which the average error of the prediction outputs is obtained by constantly using the end node as the output node. That is, in this case as well, it is confirmed that, according to the minimal error prediction method according to the first embodiment, noise resistance can be improved.

2. Second Embodiment

<2.1 Learning Operation>

Next, learning operation in an information processing device according to a second embodiment will be described referring to FIGS. 7 to 10. Note that the hardware configuration of the information processing device according to the second embodiment is the same as the hardware configuration of the information processing device 10 according to the first embodiment, and thus, the description of the hardware configuration is omitted here.

Figure 7:
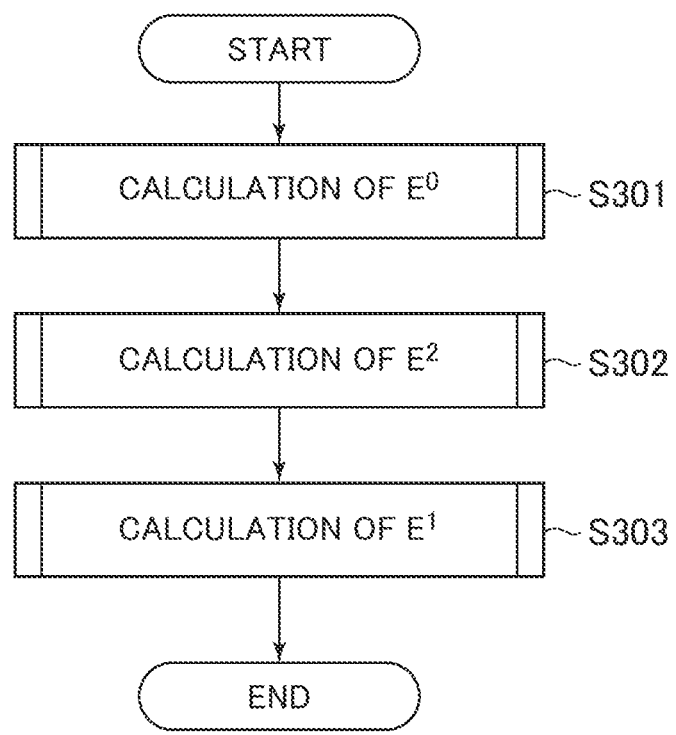
FIG. 7 is a general flowchart at the time of the learning operation of an information processing device according to a second embodiment.

FIG. 7 is a general flowchart of learning operation of the information processing device according to the present embodiment. FIG. 7 is a flowchart at a learning stage in relation to an end node error $E^0$, first errors $E^1$, and a second error $E^2$ that are reliability indexes at the time when a node that is to be selected as an output node is selected from among individual nodes existing on a route on learning trees corresponding to input data. As a premise, by the input of predetermined data into the information processing device 10, state spaces to which the relevant input data is to belong are specified, and by this specification of the state spaces, one route composed of a plurality of nodes is already specified on the learning trees.

Upon start of the processing, firstly, the end node error $E^0$, which will be described later, is calculated (S301). Thereafter, the second error $E^2$ is calculated, as described later (S302). Finally, the errors $E^1$ are calculated (S303), and the learning processing ends. Note that the order of these calculations may be arbitrarily determined and the calculations may be made from the calculation of any one of the above kinds of errors.

FIG. 8 is a flowchart in relation to the calculation of the end node error $E^0$. Upon start of processing, firstly, a post-learning end error $E^0$ is acquired by performing a weighting addition using a forgetting coefficient α on the absolute value of the difference between a prediction output based on learning data corresponding to the end node and an output O corresponding to the input data (S3011). That is, the calculation (updating) of the end node error $E^0$ is made using the following formula.

$$E_{t+1}=(1-\alpha)E_t+\alpha|\hat{O}-O|$$

Thereafter, the acquired end node error $E^0$ is stored into the storage unit 4 (S3012), and the processing ends.

FIG. 9 is a flowchart in relation to the calculation of the second error $E^2$. Upon start of processing, firstly, a post-learning second error $E^2$ is acquired by performing a weighting addition using a forgetting coefficient α on the absolute value of the difference between a prediction output based on learning data corresponding to a node for which a corresponding first error $E^1$ is minimal and the output O corresponding to the input data on the route (S3021). That is, the calculation (updating) of the second error $E^2$ is made using the following formula.

$$E_{t+1}=(1-\alpha)E_t+\alpha|\hat{O}-O|$$

Thereafter, the acquired second error $E^2$ is stored into the storage unit 4, and the processing ends (S3022).

Figure 10:
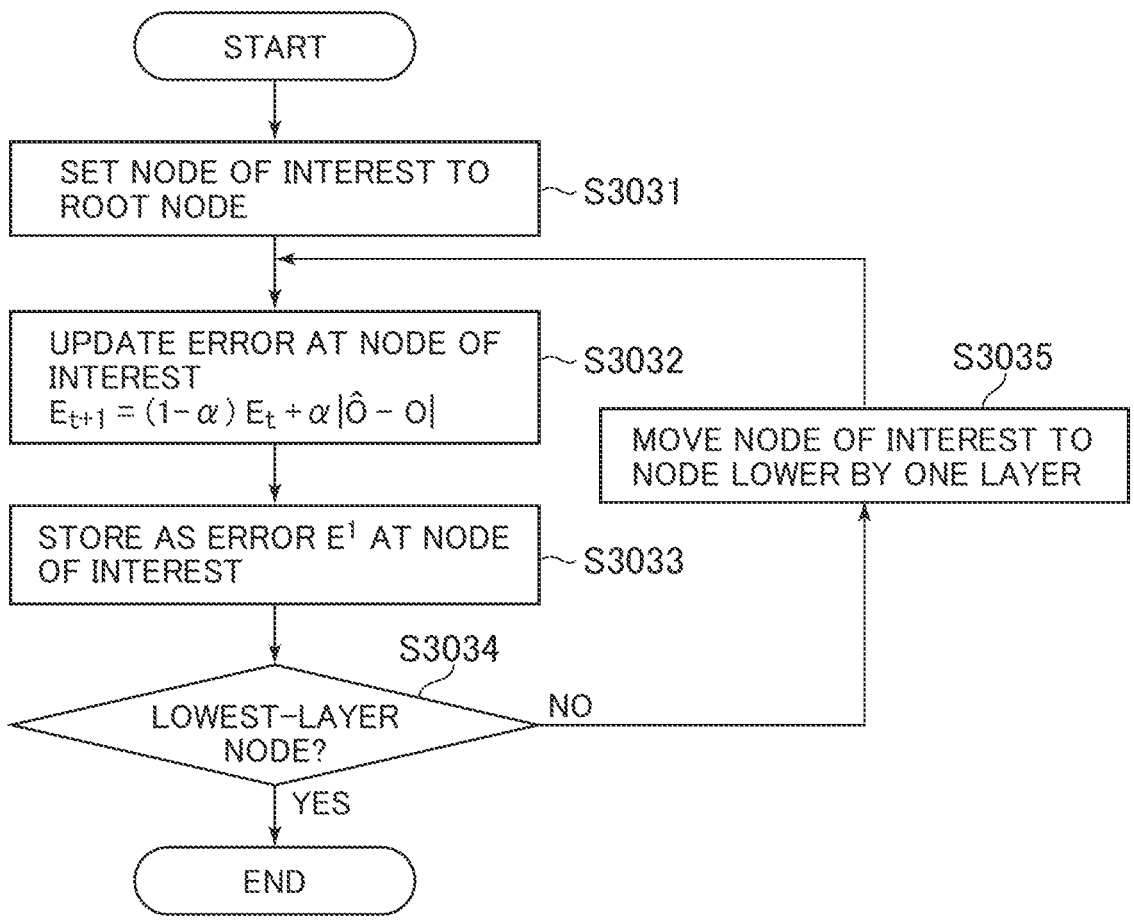
FIG. 10 is a flowchart in relation to the calculation of errors $E^1$.

FIG. 10 is a flowchart in relation to the calculation of the first errors $E^1$. Upon start of processing, firstly, a root node is set to a node of interest (S3031). A post-learning first error $E^1$ is acquired by performing a weighting addition using a forgetting coefficient α on a first error $E^1$ having been already acquired and the absolute value of the difference between a prediction output based on learning data corresponding to the node of interest and the output O corresponding to the input data (S3032). That is, the calculation (updating) of the first error $E^1$ is made using the following formula.

$$E_{t+1}=(1-\alpha)E_t+\alpha|\hat{O}-O|$$

Thereafter, the acquired first error $E^1$ is stored into the storage unit 4 (S3033). The updating of the first error $E^1$ using the first error $E^1$ and the prediction output at each of the nodes on the route (S3032) and the storage of the updated first error $E^1$ into the storage unit 4 (S3033) are repeatedly performed (S3034 NO) by sequentially moving the node of interest from the root node up to the end node (S3035). When the first errors $E^1$ up to the end node have been calculated and stored (S3034 YES), the processing ends.

According to the above configuration, the reliability indexes to determine a node that is to be the basis of the generation of the prediction output can be acquired by gradual learning processing. With this configuration, the information processing device 10 having error resistance can be provided.

<2.2 Prediction Operation>

Next, a procedure for performing prediction processing for predicting an output to a predetermined input (a selective minimal error prediction method) using the learned information processing device 10 will be described in details referring to FIG. 11.

Figure 11:
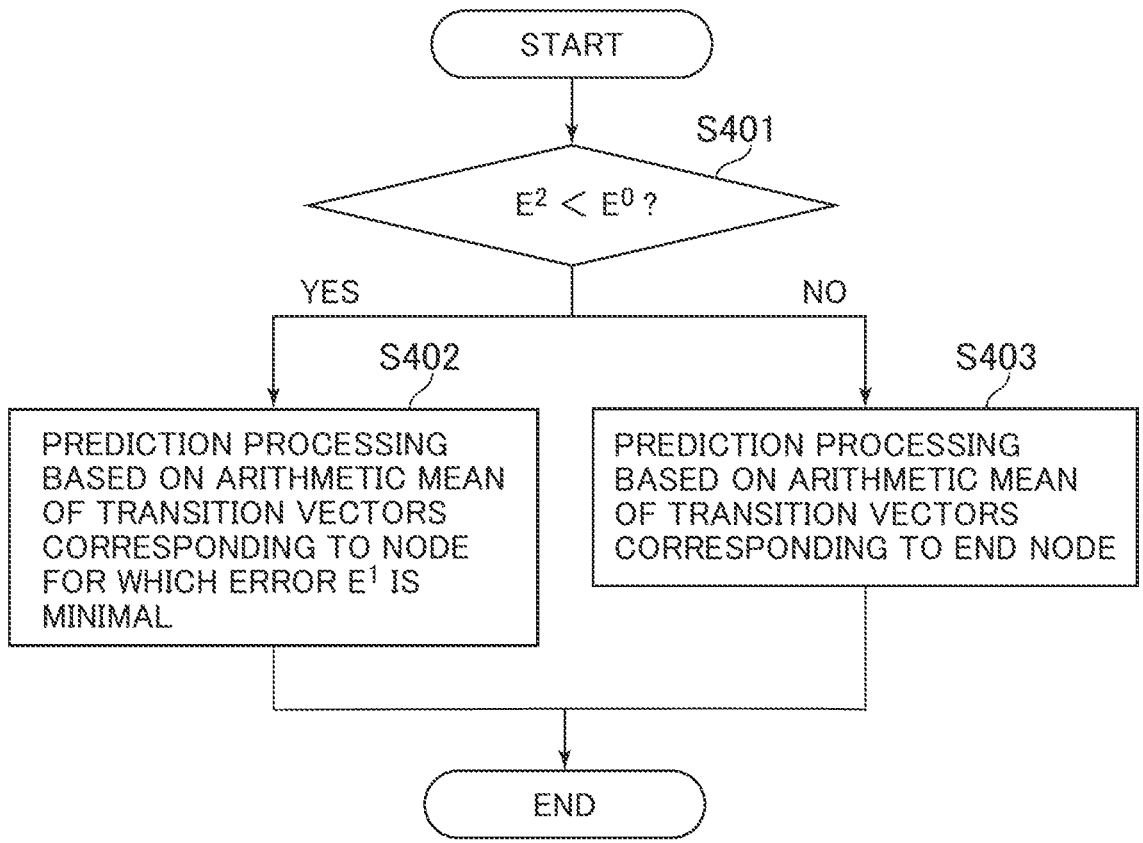
FIG. 11 is a flowchart at the time of the prediction operation of the information processing device according to the second embodiment.

FIG. 11 is a flowchart that describes the prediction operation of the information processing device 10. Here, as a premise, by the input of predetermined data into the information processing device 10, one route composed of a plurality of nodes is already specified on learning trees.

In FIG. 11, upon start of processing, a determination process as to whether or not a condition that the second error $E^2$ is smaller than the end node error $E^0$ is satisfied is performed (S401). When the second error $E^2$ is smaller than the end node error $E^0$ (S401 YES), a node for which a corresponding first error $E^1$ is minimal is selected as an output node from among the individual nodes on the route, and a prediction output is generated based on the arithmetic mean of state transition vectors corresponding to the relevant node (S402). In contrast, otherwise (S401 NO) the end node is selected as the output node, and the prediction output is generated based on the arithmetic mean of state transition vectors corresponding to the end node (S403). After the generation of the prediction output, the prediction processing ends.

According to the above configuration, when it is more appropriate to make a prediction at the end node, the end node is specified as the output node, while, when it is more appropriate to make a prediction at a node other than the end node, a node for which an error from a prediction output is the smallest in the results of learning having been performed so far is specified as the output node, and thus, more highly accurate prediction processing can be achieved.

3. Third Embodiment

<3.1 Learning Operation>

Next, learning operation in an information processing device according to a third embodiment will be described referring to FIGS. 12 and 13. Note that the hardware configuration of the information processing device according to the third embodiment is the same as the hardware configuration of the information processing device 10 according to the first embodiment, and thus, the description of the hardware configuration is omitted here.

Figure 12:
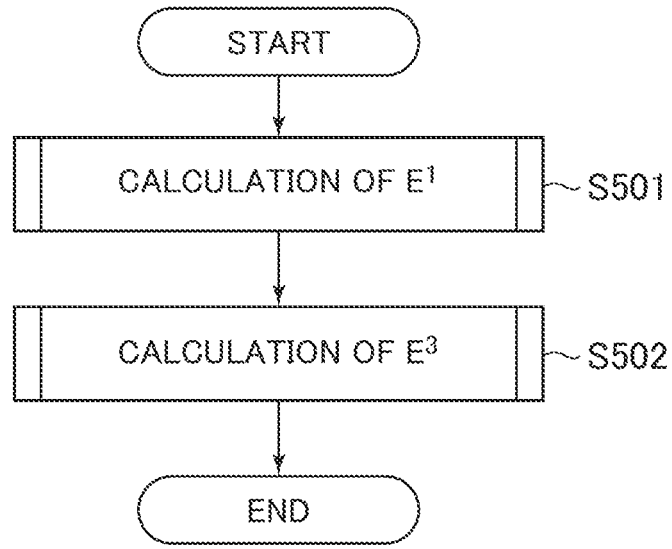
FIG. 12 is a general flowchart at the time of the learning operation of an information processing device according to a third embodiment.

FIG. 12 is a general flowchart of learning operation of the information processing device according to the present embodiment. That is, FIG. 12 is a flowchart at a learning stage in relation to first errors $E^1$ and third errors $E^3$ that are reliability indexes at the time when a node that is to be selected as an output node is selected from among individual nodes existing on a route on learning trees corresponding to input data. As a premise, by the input of predetermined data into the information processing device 10, state spaces to which the relevant input data is to belong are specified, and by this specification of the state spaces, one route composed of a plurality of nodes is already specified on the learning trees.

Upon start of processing, firstly, the first errors $E^1$ are calculated in the same calculation method as that of the first embodiment (S501). Thereafter, the third errors $E^3$ are calculated (S502), as described later, and the learning processing ends. Note that the order of these calculations may be arbitrarily determined and the calculations may be made from the calculation of any one of the above kinds of errors.

Figure 13:
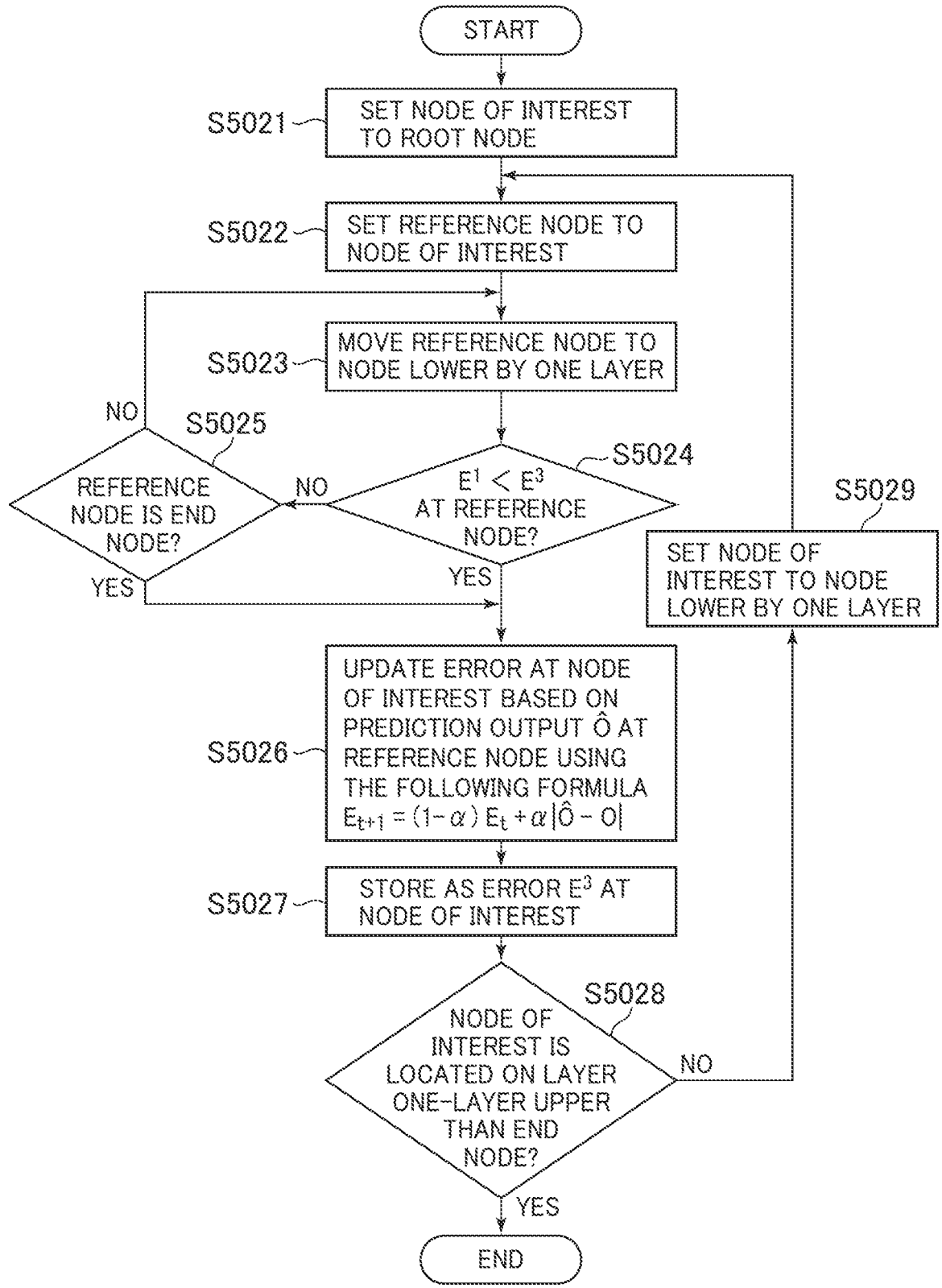
FIG. 13 is a flowchart in relation to the calculation of errors $E^3$.

FIG. 13 is a flowchart in relation to the calculation of the third errors $E^3$. Upon start of processing, a root node is set as a node of interest (S5021). Further, the same node as the relevant node of interest is set as a reference node (S5022). Thereafter, in a state in which the position of the node of interest remains fixed, the reference node is moved to a layer lower by one layer on the route (S5023). After the movement, at the relevant reference node, the magnitude relation between a first error $E^1$ and a third error $E^3$ is compared with each other (S5024), and when a condition that the first error $E^1$ is smaller than the third error $E^3$ is satisfied at the relevant reference node (S5024 YES), a third error $E^3$ at the node of interest is updated using a prediction output at the reference node, based on the following formula.

$$E_{t+1}=(1-\alpha)E_t+\alpha|\hat{O}-O|$$

In contrast, when the condition that the first error $E^1$ is smaller than the third error $E^3$ is not satisfied at the relevant reference node (S5024 NO), a process of sequentially moving the reference node to a layer lower by one layer (S5023) is repeated (S5024 NO, S5025 NO) until the satisfaction of any one of conditions: one being a condition that, at the reference node, a first error $E^1$ is smaller than a third error $E^3$ is satisfied (S5024 YES); the other one being a condition that the reference node has reached the end node (S5025 YES). When the reference node has reached the end node (S5025 YES), a third error $E^3$ at the node of interest is updated using a prediction output at the relevant reference node, based on Formula 1. Thereafter, the third error $E^3$ having been updated at the node of interest (S5026) is associated with the node of interest, and then is stored into the storage unit 4 (S5027).

The above series of processes (S5022 to S5027) are repeated (S5028 NO) by sequentially setting the node of interest to a layer lower by one layer (S5029) until the node of interest has reached a layer upper than the end node by one layer. When the node of interest has reached the layer upper than the end node by one layer (S5028 YES), the processing ends.

According to the above configuration, reliability indexes to determine a node that is to be the basis of the generation of the prediction output can be acquired by gradual learning processing. With this configuration, the information processing device 10 having error resistance can be provided.

<3.2 Prediction Operation>

Next, a procedure for performing prediction processing for predicting an output to a predetermined input using the learned information processing device 10 (namely, a lower-layer node reference method (No. 1)) will be described in details referring to FIG. 14.

Figure 14:
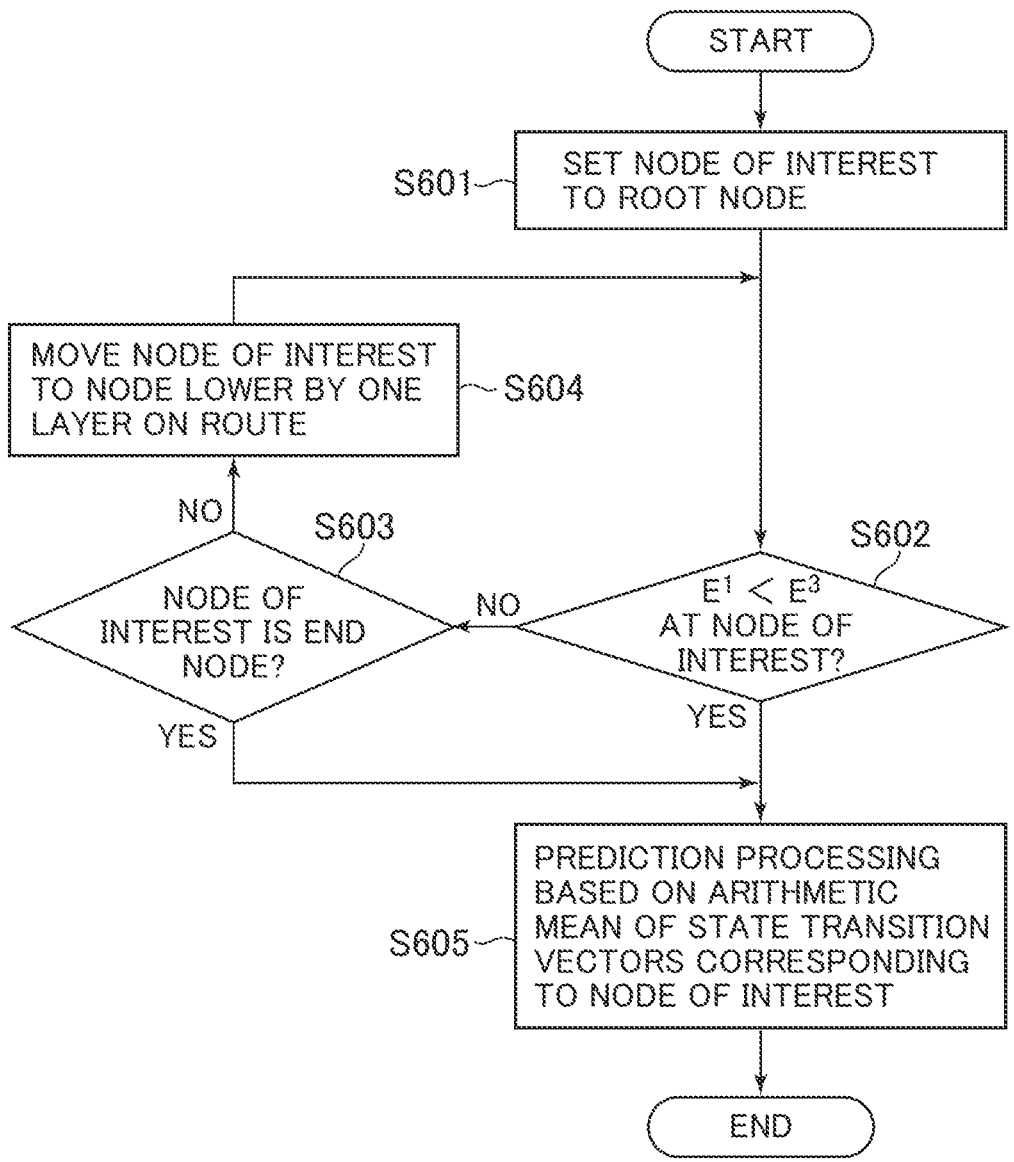
FIG. 14 is a flowchart at the time of the prediction operation of an information processing device according to a third embodiment.

FIG. 14 is a flowchart that describes the prediction operation of the information processing device 10. Here, as a premise, by the input of predetermined data into the information processing device 10, one route composed of a plurality of nodes on learning trees corresponding to the relevant input data is already specified.

In FIG. 14, upon start of processing, firstly, a root node is set to a node of interest (S601). Next, it is determined whether or not a condition that a first error $E^1$ is smaller than a third error $E^3$ is satisfied at the node of interest (S602). When the condition that the first error $E^1$ is smaller than the third error $E^3$ is satisfied at the relevant node of interest (S602 YES), the relevant node of interest is selected as an output node, and generation processing for generating a prediction output based on learning data corresponding to the relevant node of interest, that is, calculation processing for calculating the arithmetic mean of state transition vectors, is performed (S605).

In contrast, when the condition that the first error $E^1$ is smaller than the third error $E^3$ at the node of interest is not satisfied (S602 NO), a process of sequentially moving the node of interest to a layer lower by one layer on the route (S604) is repeated (S602 NO, S603 NO), except when the relevant node of interest has reached the end node (S603 YES), until the condition that the first error $E^1$ is smaller than the third error $E^3$ is satisfied at the node of interest (S602 YES). Here, when the node of interest has reached the end node (S603 YES), the relevant node of interest is selected as an output node, and generation processing for generating a prediction output based on learning data corresponding to the relevant node of interest, that is, calculation processing for calculating the arithmetic mean of state transition vectors, is performed (S605). After the generation processing for generating the prediction output has been performed, the prediction processing ends.

According to the above configuration, when the reliability of a node on each of layers of the learning trees is determined, nodes on lower layers are referred, and thus, in the specification of an output node, it can be determined to which of the nodes on the route of the learning trees the downward movement of the node is to be made, thereby enabling the achievement of more highly accurate prediction processing.

4. Fourth Embodiment

<4.1 Learning Operation>

Next, learning operation in an information processing device according to a fourth embodiment will be described referring to FIGS. 15 to 17. Note that the hardware configuration of the information processing device according to the fourth embodiment is the same as the hardware configuration of the information processing device 10 according to the first embodiment, and thus, the description of the hardware configuration is omitted here.

Figure 15:
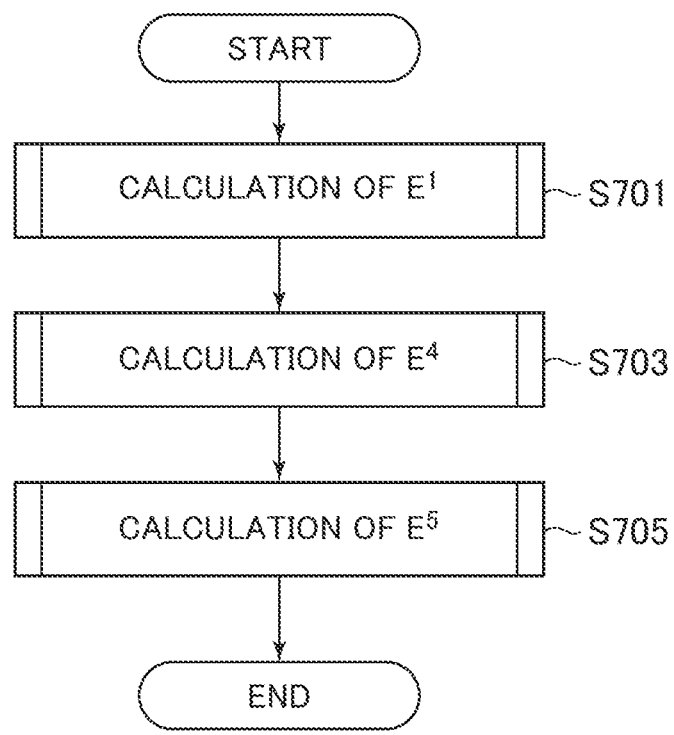
FIG. 15 is a general flowchart at the time of the learning operation of an information processing device according to a fourth embodiment.

FIG. 15 is a general flowchart of learning operation of the information processing device 10 according to the present embodiment. That is, FIG. 15 is a flowchart at a learning stage in relation to first errors $E^1$, fourth errors $E^4$, and fifth errors $E^5$ that are reliability indexes at the time when a node that is to be selected as an output node is selected from among individual nodes existing on a route on learning trees corresponding to input data. Here, as a premise, by the input of predetermined data into the information processing device 10, state spaces to which the relevant input data is to belong are specified, and by this specification of the state spaces, one route composed of a plurality of nodes is already specified on the learning trees.

Upon start of processing, firstly, the first errors $E^1$ are calculated just like in the first embodiment (S701). Thereafter, the fourth errors $E^4$ are calculated (S703), as described later; finally, the fifth errors $E^5$ described later are calculated (S705); and the learning processing ends. Note that the order of these calculations may be arbitrarily determined and the calculations may be made from the calculation of any one of the above kinds of errors.

Figure 16:
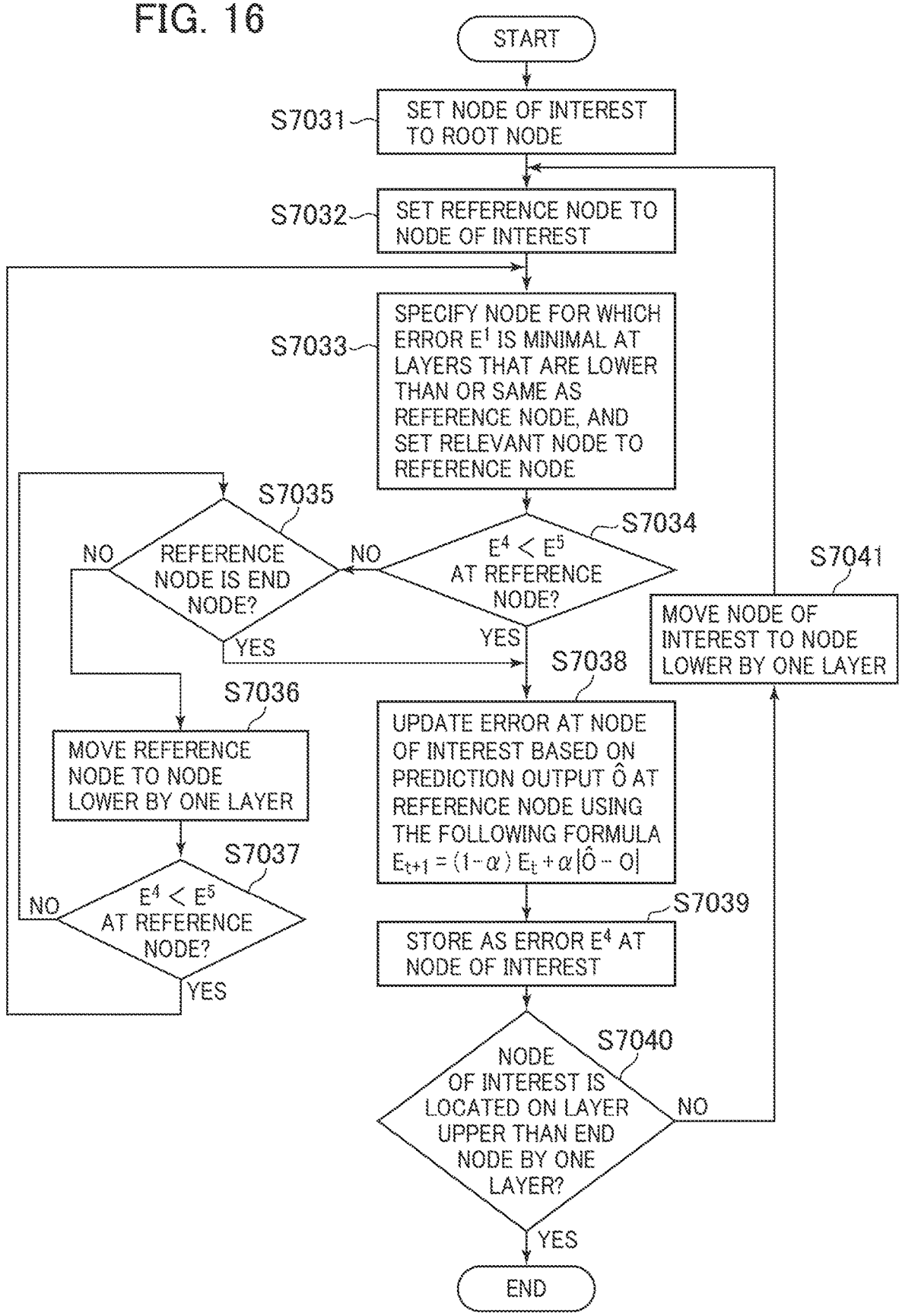
FIG. 16 is a flowchart in relation to the calculation of errors $E^4$.

FIG. 16 is a flowchart in relation to the calculation of the fourth errors $E^4$. Upon start of processing, firstly, a root node is set as a node of interest (S7031). Further, the relevant node of interest is set as a reference node (S7032). Thereafter, a process of specifying a node for which a corresponding error $E^1$ is minimal, from nodes that are lower than or the same as the reference node, the nodes including the reference node, and of setting the relevant node to a reference node is performed (S7033). Thereafter, a comparison process of making a comparison in a magnitude relation for a fourth error $E^4$ and a fifth error $E^5$ at the relevant reference node is performed (S7034). When a condition that the fourth error $E^4$ is smaller than the fifth error $E^5$ is satisfied at the relevant reference node (S7034 YES), a fourth error $E^4$ at the node of interest is updated using a prediction output at the relevant reference node, based on the following formula (S7038).

$$E_{t+1}=(1-\alpha)E_t+\alpha|\hat{O}-O|$$

In contrast, when the condition that the fourth error $E^4$ is smaller than the fifth error $E^5$ is not satisfied at the relevant reference node (S7034 NO), a process of moving the reference node to a layer lower by one layer (S7036) is repeated (S7037 NO), except when the relevant reference node has arrived at the end node (S7035 NO), until the arrival at a node for which the condition that the fourth error $E^4$ is smaller than the fifth error $E^5$ at the reference node is satisfied. When the node for which the condition that the fourth error $E^4$ is smaller than the fifth error $E^5$ at the reference node is satisfied exists in mid-course of the repetition (S7037 YES), the process flow returns again to the step (S7033) at which a node for which a corresponding first error $E^1$ is minimal is specified. Further, when the reference node has arrived at the end node (S7035 YES), the fourth error $E^4$ at the node of interest is updated using a prediction output at the reference node, based on Formula 1 (S7038). The calculated fourth error $E^4$ is associated with the node of interest, and then is stored into the storage unit 4 (S7039).

The above series of processes (S7032 to S7039) are repeated (S7040 NO) while the node of interest is sequentially set to a layer lower by one layer (S7041), until the node of interest has reached the end node. When the node of interest has reached the end node, the processing ends.

Figure 17:
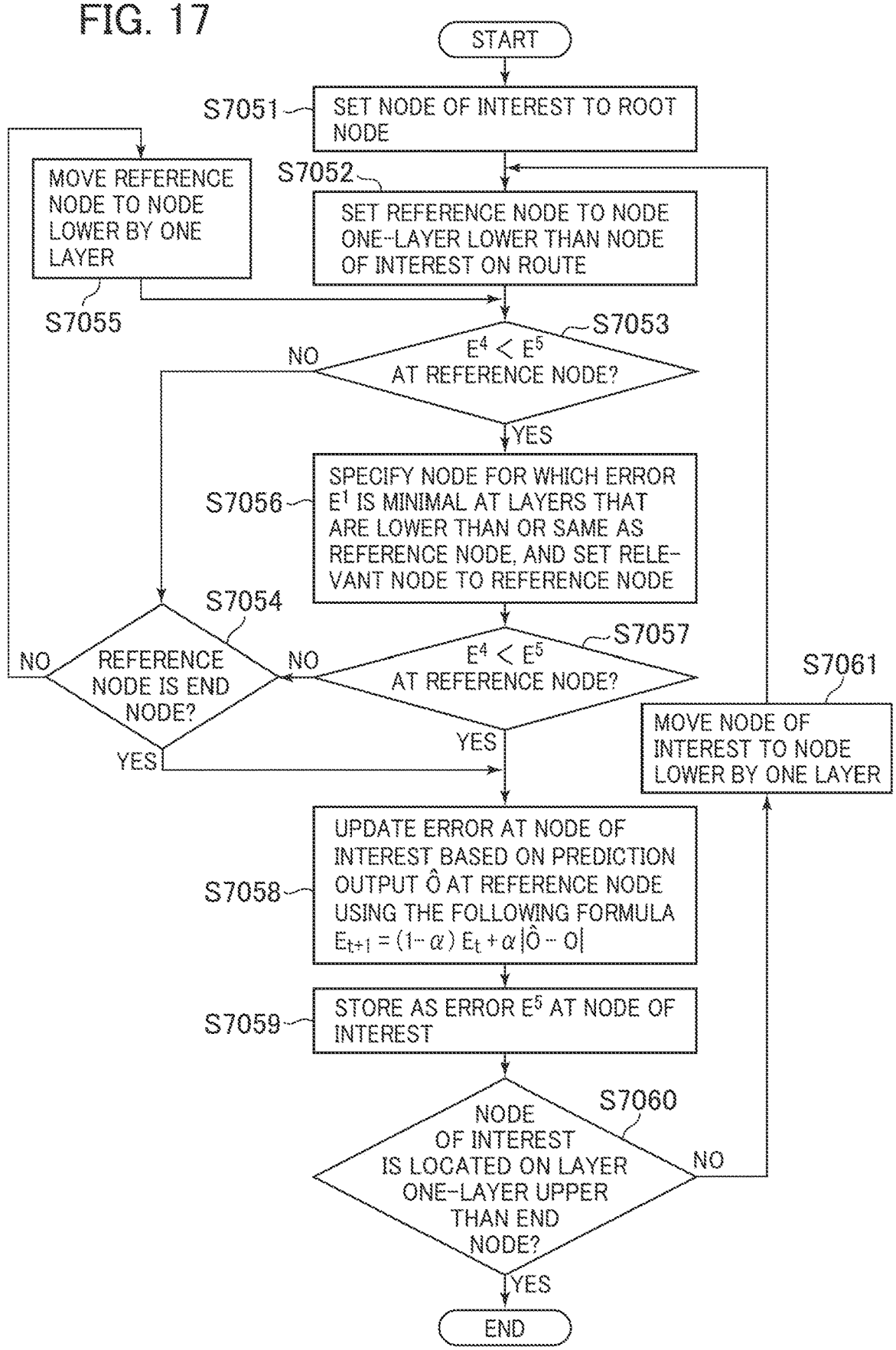
FIG. 17 is a flowchart in relation to the calculation of errors $E^5$.

Next, FIG. 17 is a flowchart in relation to the calculation of the fifth errors $E^5$. Upon start of processing, firstly, the root node is set as a node of interest (S7051). Further, a node existing on the route and being lower than the node of interest by one layer is set as a reference node (S7052). Thereafter, a comparison process of making a comparison in a magnitude relation for a fourth error $E^4$ and a fifth error $E^5$ at the reference node is performed (S7053).

When a condition that the fourth error $E^4$ is smaller than the fifth error $E^5$ is not satisfied at the reference node (S7053 NO), a process of sequentially moving the reference node to a node lower by one layer on the route (S7055) is repeated (S7053 NO, S7054 NO) in a state in which the node of interest remains fixed, expect when the reference node has reached the end node (S7054 YES). When the reference node has reached the end node (S7054 YES), a fifth error $E^5$ at the node of interest is updated using a prediction output at the relevant reference node by the following formula.

$$E_{t+1}=(1-\alpha)E_t+\alpha|\hat{O}-O|$$

In contrast, when the condition that the fourth error $E^4$ is smaller than the fifth error $E^5$ is satisfied at the reference node (S7053 YES), a node which exists on the route and is located on one of layers that are lower than or the same as the reference node and for which a corresponding first error $E^1$ is minimal is specified, and the relevant node is set to a new reference node (S7056). Thereafter, it is determined again whether or not the condition that a fourth error $E^4$ is smaller than a fifth error $E^5$ at the relevant reference node is satisfied (S7057), and when the relevant condition is satisfied (S7057 YES), a fifth error $E^5$ at the node of interest is updated using a prediction output at the relevant reference node by Formula 1 (S7058). In contrast, when the relevant condition is not satisfied (S7057 NO), the process of sequentially moving the reference node to a node existing on the route and located on a layer lower by one layer (S7055) is repeated (S7053 NO, S7054 NO) in a state in which the node of interest remains fixed, expect when the relevant reference node has reached the end node (S7054 YES). When the reference node has reached the end node (S7054 YES), a fifth error $E^5$ at the node of interest is updated using a prediction output at the relevant reference node by Formula 1. The calculated fifth error $E^5$ is stored into the storage unit 4 (S7059).

The above series of processes (S7052 to S7059) are performed while a process of moving the node of interest to a layer lower by one layer (S7061) is sequentially performed, and are repeated until the node of interest has reached a layer upper than the end node by one layer (S7060 NO). When the node of interest has reached the layer upper than the end node by one layer (S7060), the processing ends.

According to the above configuration, reliability indexes to determine node that is to be the basis of the generation of the prediction output can be acquired by gradual learning processing. With this configuration, the information processing device 10 having error resistance can be provided.

<4.2 Prediction Operation>

Next, a procedure for performing prediction processing for predicting an output to a predetermined input using the learned information processing device 10 according to the present embodiment (namely, a lower-layer node reference method (No. 2)) will be described in details referring to FIG. 18.

Figure 18:
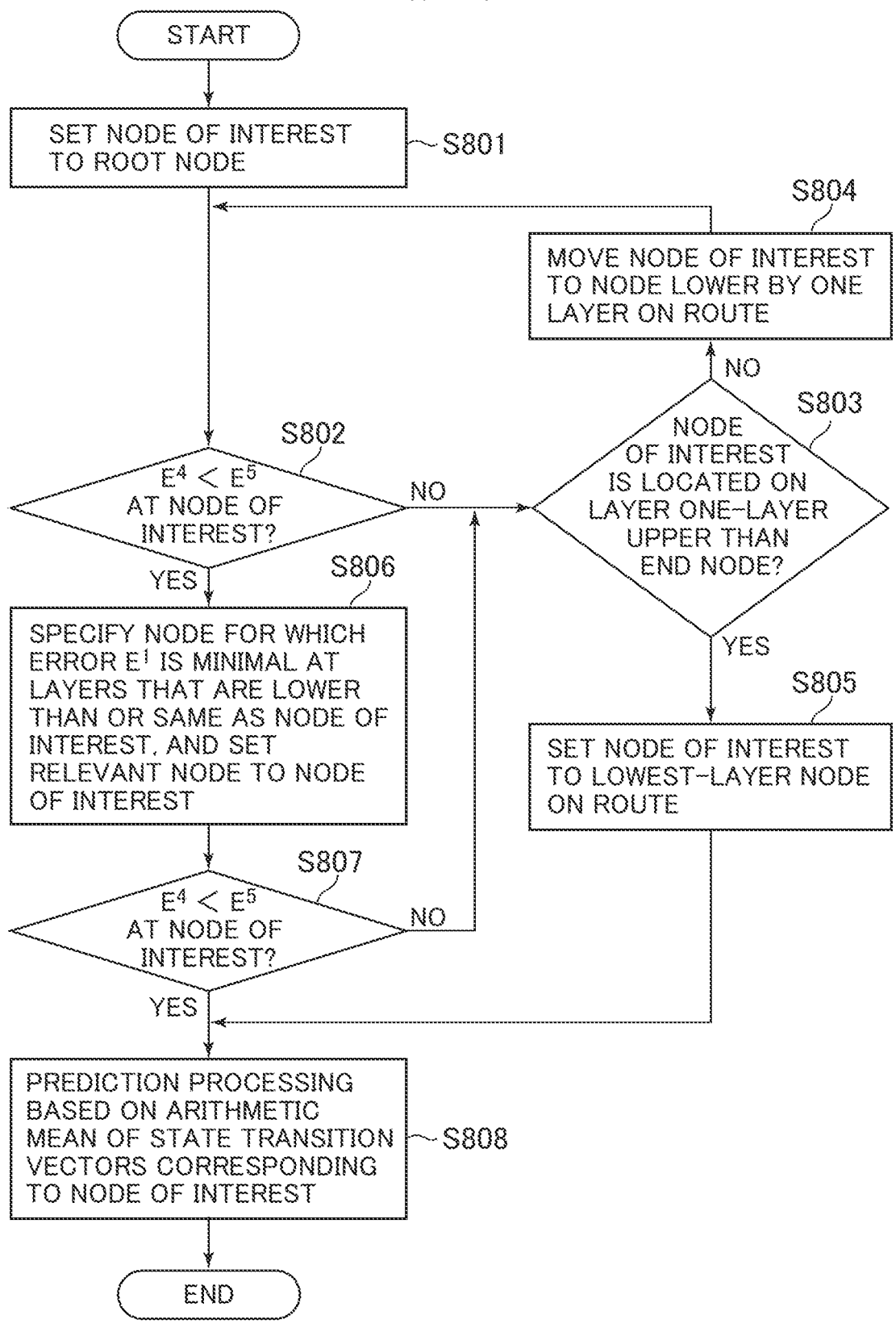
FIG. 18 is a flowchart at the time of the prediction operation of the information processing device according to the fourth embodiment.

FIG. 18 is a flowchart that describes the prediction operation of the information processing device 10. Here, as a premise, by the input of predetermined data into the information processing device 10, one route composed of a plurality of nodes on learning trees corresponding to the relevant input data is already specified.

In FIG. 18, upon start of processing, firstly, a node of interest is set so as to be a root node (S801). Next, it is determined whether or not a condition that a fourth error $E^4$ is smaller than a fifth error $E^5$ is satisfied at the node of interest (S802). When it is determined that the relevant condition is satisfied (S802 YES), a node which exists on a layer that is lower than or the same as the relevant node of interest and for which a corresponding first error $E^1$ is minimal is specified, and the relevant node is set to a node of interest (S806). It is determined whether or not the condition that a fourth error $E^4$ is smaller than a fifth error $E^5$ is satisfied at the relevant node of interest (S807), and when the relevant condition is satisfied (S807 YES), the relevant node of interest is determined as an output node, and a prediction output at the relevant node of interest, that is, a state transition vector based on the arithmetic mean of individual state transition vectors associated with learned data, is generated (S808). In contrast, when the relevant condition is not satisfied (S807 NO), the process flow proceeds to a recursive process that, as described later, moves the node of interest to a layer lower by one layer (S803 NO, S804).

Further, when the condition that the fourth error $E^4$ is smaller than the fifth error $E^5$ is not satisfied at the node of interest (S802 NO), a process of moving the node of interest to a layer lower by one layer (S804) is repeated (S802 NO, S803 NO) until the arrival at a node for which the condition that a fourth error $E^4$ is smaller than a fifth error $E^5$ is satisfied, except when the node of interest has reached a node upper than the end node by one layer (S803 NO). When the node of interest has reached the layer higher than the end node by one layer (S803 YES), the node of interest is set to the end node on the route (S805), and generation processing for generating a prediction output based on the end node, that is, the generation of a state transition vector based on the arithmetic mean of state transition vectors associated with learned data, is performed (S808). After the generation processing for generating the prediction output has been performed, the processing ends.

According to the above configuration, when the reliability of a node on each of layers of learning trees is determined, nodes on lower layers are referred, and thus, in the specification of an output node, it can be determined to which of the nodes on the lower layers the downward movement of the node on the route is to be made, thereby enabling the achievement of more highly accurate prediction processing.

5. Comparison Experiments

Figure 19:
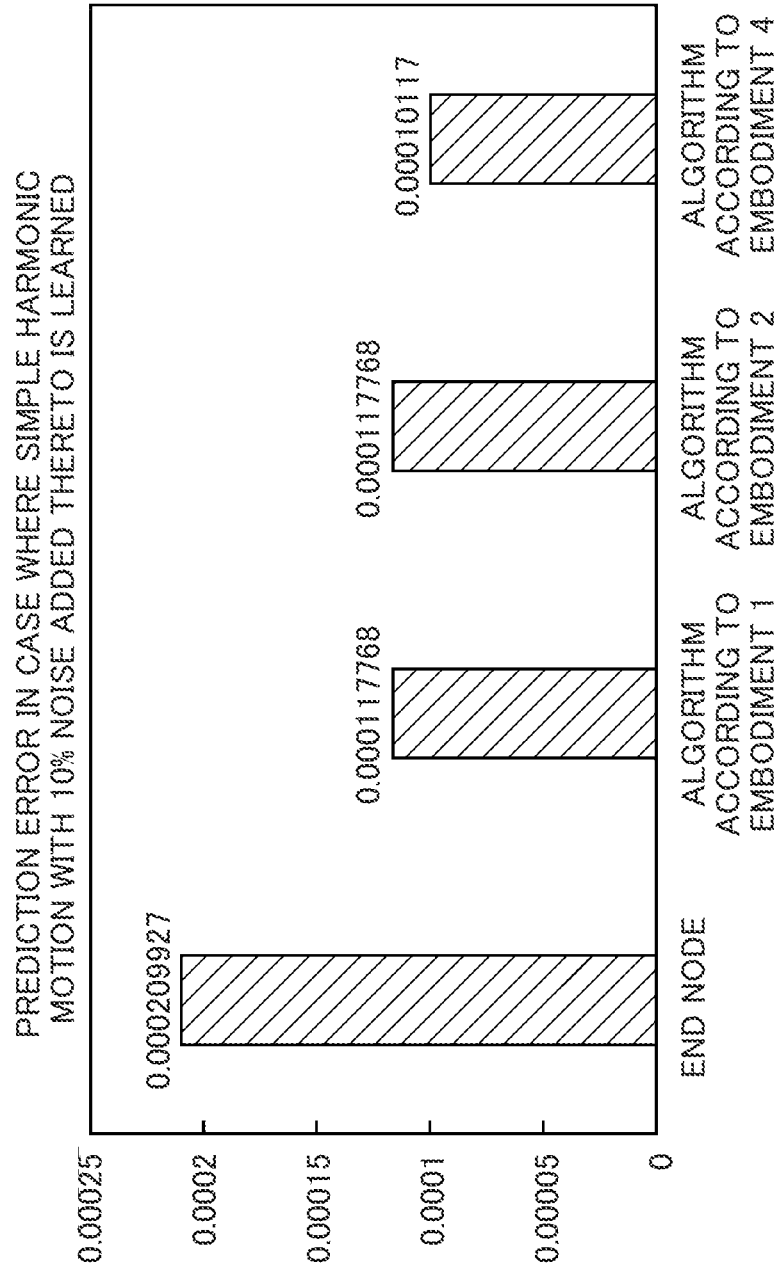
FIG. 19 is a result of comparison experiments (No. 1).

FIG. 19 illustrates a result of comparison experiments (No. 1), which indicates the average prediction error between a correct answer value and each of prediction outputs having been obtained using the conventional method in which an end node is constantly used as an output node, the prediction method according to the first embodiment, the prediction method according to the second embodiment, and the prediction method according to the fourth embodiment. Here, an object to be learned was a simple harmonic motion with noise added thereto, and an acceleration at the time when a position and a velocity were input was predicted (two inputs and one output). Further, 10% random noise was added to the position, the number of pieces of to-be-learned data was 30000, and the number of pieces of prediction data was 15000.

It can be confirmed from FIG. 19 that any one of the average prediction errors that were obtained using the prediction method according to the first embodiment, the prediction method according to the second embodiment, and the prediction method according to the fourth embodiment is smaller than the average prediction error that was obtained using the conventional method. According to specific description using numeric values, the average prediction error based on the conventional method was 0.000209927; the average prediction error based on the prediction method according to the first embodiment was 0.000117768; the average prediction error based on the prediction method according to the second embodiment was 0.000117768; the average prediction error based on the prediction method according to the fourth embodiment was 0.00010117; and ratios of the above values corresponding to the respective embodiments relative to the above value corresponding to the conventional method were 56.69%, 56.09%, and 48.19%. From this result, the improvement of the noise resistance can be confirmed.

Figure 20:
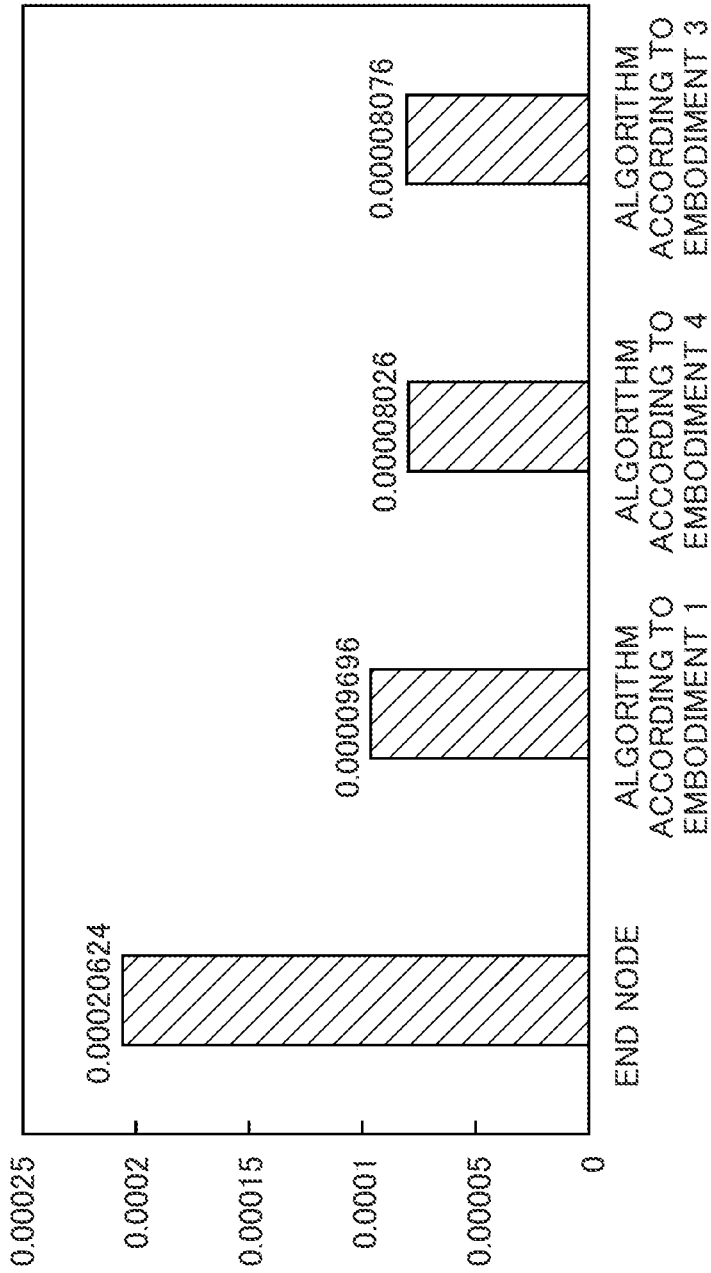
FIG. 20 is a result of comparison experiments (No. 2).

Further, FIG. 20 illustrates a result of comparison experiments (No. 2), which indicates the average prediction error between a correct answer value and each of prediction outputs having been obtained using the conventional method in which an end node is constantly used as an output node, the prediction method according to the first embodiment, the prediction method according to the fourth embodiment, and the prediction method according to the third embodiment. Here, an object to be learned was a simple harmonic motion with noise added thereto, and an acceleration at the time when a position and a velocity were input was predicted (two inputs and one output). Further, 10% random noise was added to the position, the number of pieces of learning data was 100000, and the number of pieces of prediction data was 15000.

It can be confirmed from FIG. 20 that any one of the average prediction errors that were obtained using the prediction method according to the first embodiment, the prediction method according to the fourth embodiment, and the prediction method according to the third embodiment is smaller than the average prediction error that was obtained using the conventional method. According to specific description using numeric values, the average prediction error based on the conventional method was 0.00020624; the average prediction error based on the prediction method according to the first embodiment was 0.00009696; the average prediction error based on the prediction method according to the fourth embodiment was 0.00008026; the average prediction error based on the prediction method according to the third embodiment was 0.00008076; and ratios of the above values corresponding to the respective embodiments relative to the above value corresponding to the conventional method were 47.01%, 38.91%, and 39.16%. From this result, the improvement of the noise resistance can be confirmed.

6. Fifth Embodiment

Next, a fifth embodiment according to the present invention will be described referring to FIGS. 21 and 22. Note that the hardware configuration of an information processing device according to the present embodiment is the same as the hardware configuration of the information processing device 10 according to the first embodiment, and thus, the description of the hardware configuration is omitted here.

<6.1 Learning Operation>

Firstly, learning operation in the information processing device 10 according to the present embodiment will be described. In the present embodiment, just like in the first embodiment, first errors $E^1$ are calculated for individual nodes through the input of a predetermined set of pieces of data for training. Note that a method of calculating the first errors $E^1$ is the same as that according to the first embodiment (see FIG. 2), and thus is omitted from description here.

<6.2 Prediction Operation>

Next, a procedure for performing prediction processing for predicting an output to a predetermined input using learned information processing device 10 according to the present embodiment (a calculation possibility reference method) will be described in details referring to FIGS. 21 and 22.

Figure 21:
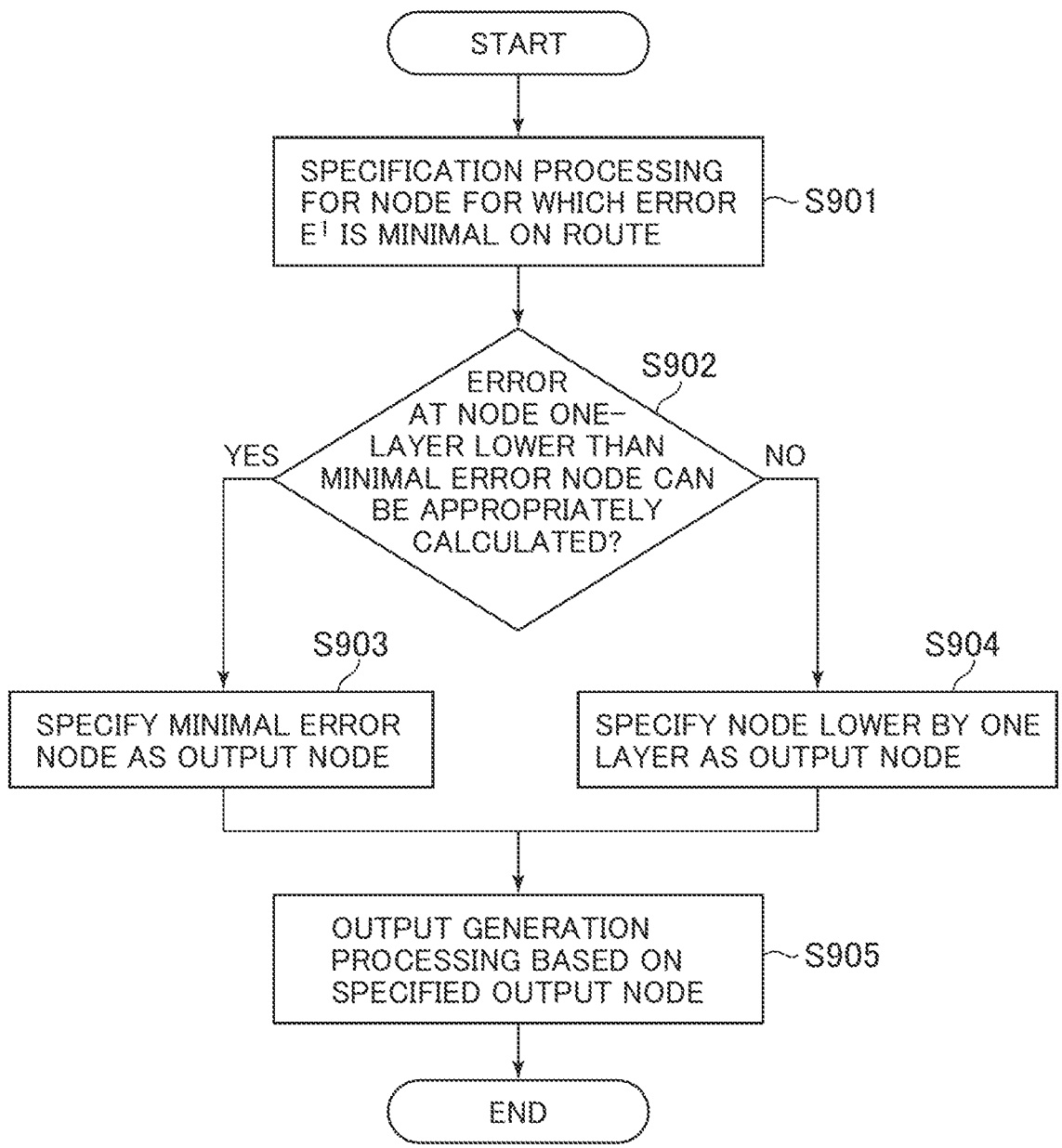
FIG. 21 is a flowchart at the time of the prediction operation of an information processing device according to a fifth embodiment.

FIG. 21 is a flowchart at the time when prediction operation is performed in the information processing device 10 according to the present embodiment. Here, in FIG. 21, as a premise of the beginning of processing, by the input of predetermined data into the information processing device 10, state spaces to which the relevant input data is to belong are specified, and by this specification of the state spaces, one route composed of a plurality of nodes is specified on learning trees.

As is obvious from FIG. 21, upon start of the processing, firstly, a process of specifying a node for which a corresponding first error $E^1$ among the first errors $E^1$, which have been calculated in the above learning operation, is minimal, from nodes on a predetermined route corresponding to the predetermined input (S901). Thereafter, a first error $E^1$ at a node that is one node lower than the node for which the corresponding first error $E^1$ is minimal is referred to, and it is determined whether or not the relevant first error $E^1$ can be appropriately calculated (S902). Here, in the present embodiment, the determination as to whether or not the relevant first error $E^1$ can be appropriately calculated substantially means a determination as to whether or not the number of times of learnings for the node is one (whether or not the number of pieces of data existing in a state space corresponding to the node is one). This is based on that, in the present embodiment, a first error $E^1$ at a node for which the number of times of learnings is one is defined as an infinitive value ($\infty$) for the sake of convenience, and at the time when the number of times of learnings is larger than or equal to two, an appropriate calculation based on Formula 1 can be made for the first time.

When the first error $E^1$ at a node that is one node lower than the node for which the corresponding first error $E^1$ is minimal can be appropriately calculated (S903 YES), the node for which the corresponding first error $E^1$ is minimal is specified as an output node that is the basis of the calculation of an output (S903). In contrast, when the first error $E^1$ at a node that is one node lower than the node for which the corresponding first error $E^1$ is minimal cannot be appropriately calculated (S903 NO), the relevant node that is one node lower is specified as the output that is the basis of the calculation of the output (S904). Thereafter, an output generation process based on the specified output, that is, a process of generating an output by calculating the arithmetic mean of output vectors associated with individual pieces of data corresponding to the output node, is performed. Thereafter, the processing ends.

FIG. 22 is a conceptual diagram in relation to the specification of an output node (S902 to S904).

Figure 22A:
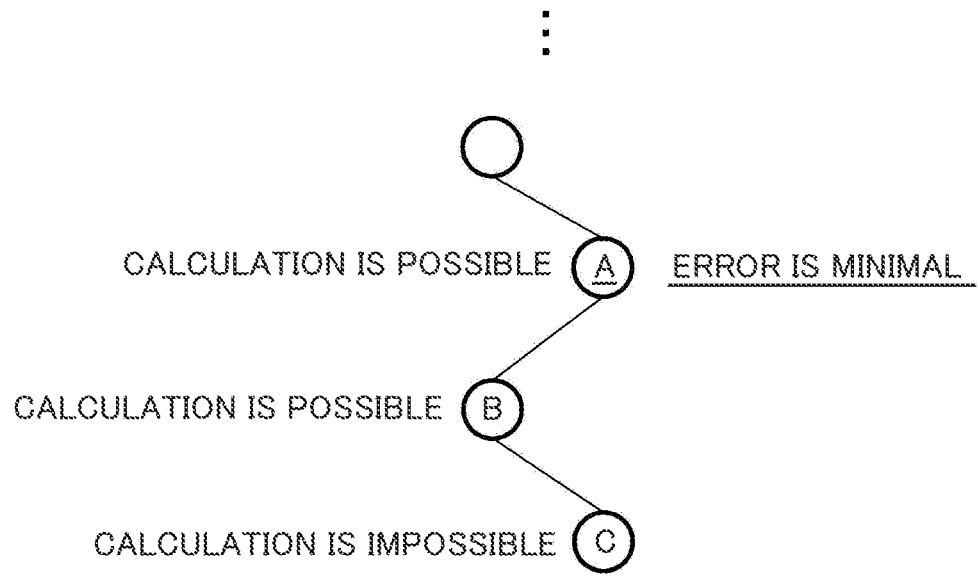
FIG. 22A is a conceptual diagram in relation to the specification of an output node, and is particularly a diagram illustrating a specification example (No. 1).

FIG. 22A is a first example in relation to the specification of an output node. FIG. 22A illustrates nodes on a predetermined route having been specified so as to correspond to a predetermined input, and in the example of FIG. 22A, for the sake of convenience, a second node from its top is illustrated as a node A; a second node from its bottom is illustrated as a node B; and an end node is illustrated as a node C. Further, in the example of FIG. 22A, the node A is specified as a node for which a corresponding first error $E^1$ is minimal (S901); the node A and the node B are nodes for which the calculation can be appropriately made; and the node C is a node for which the calculation cannot be appropriately made. Under such conditions, when a node (the node B) that is located one node lower than a node (the node A) for which a corresponding first error $E^1$ is minimal is referred to (S902), the node B is a node for which the calculation can be made (S902 YES), and thus, the node (the node A) for which a corresponding first error $E^1$ is minimal is specified as an output node (S903).

Figure 22B:
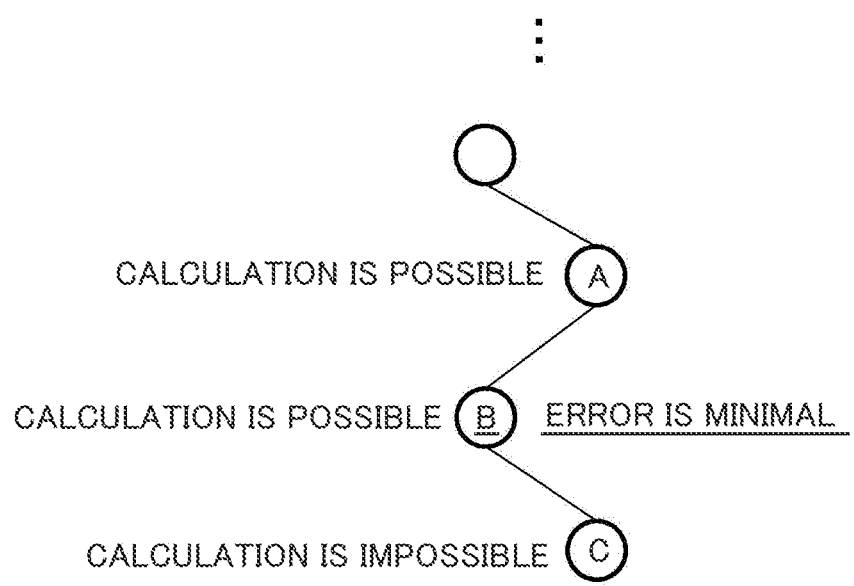
FIG. 22B is a conceptual diagram in relation to the specification of an output node, and is particularly a diagram illustrating a specification example (No. 2).
Figure 23A:
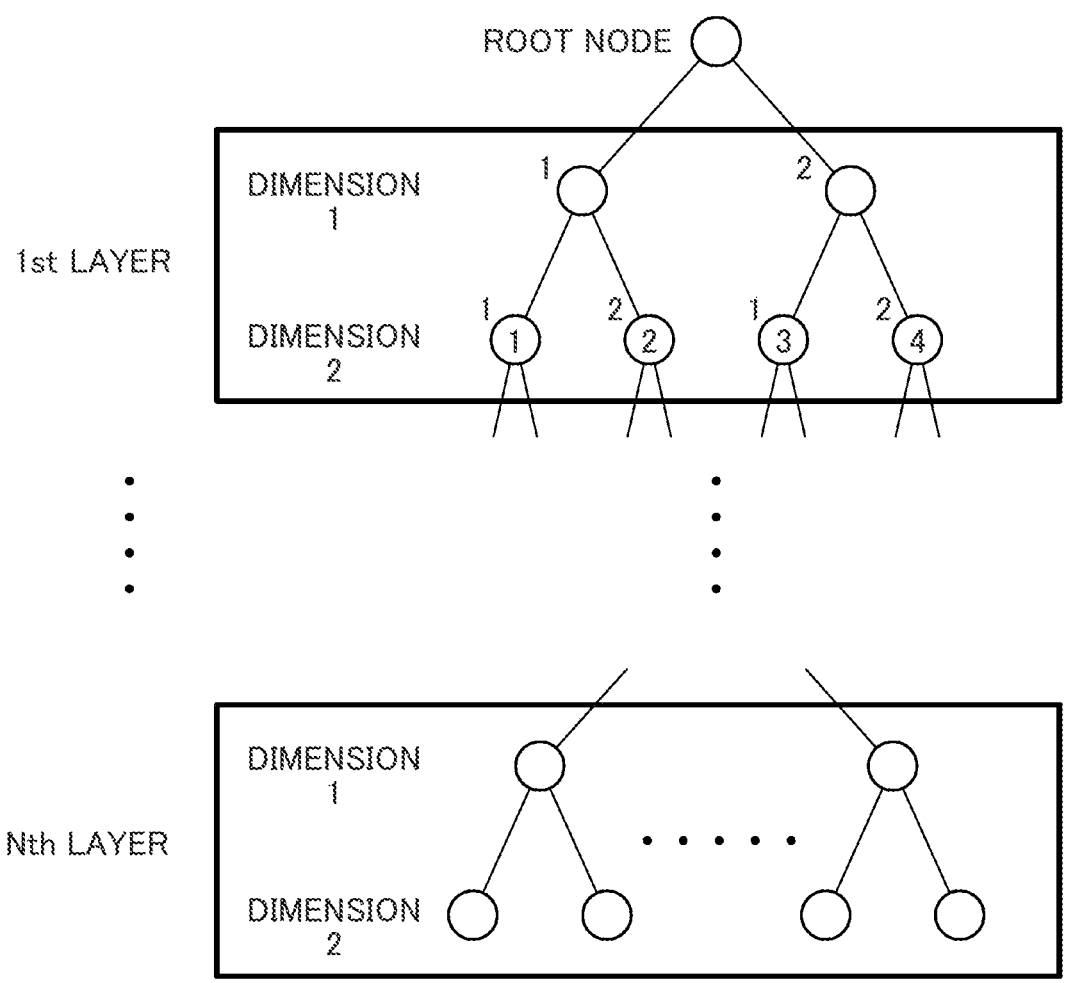
FIG. 23A is a description diagram illustrating a structure of a learning tree.
Figure 24A:
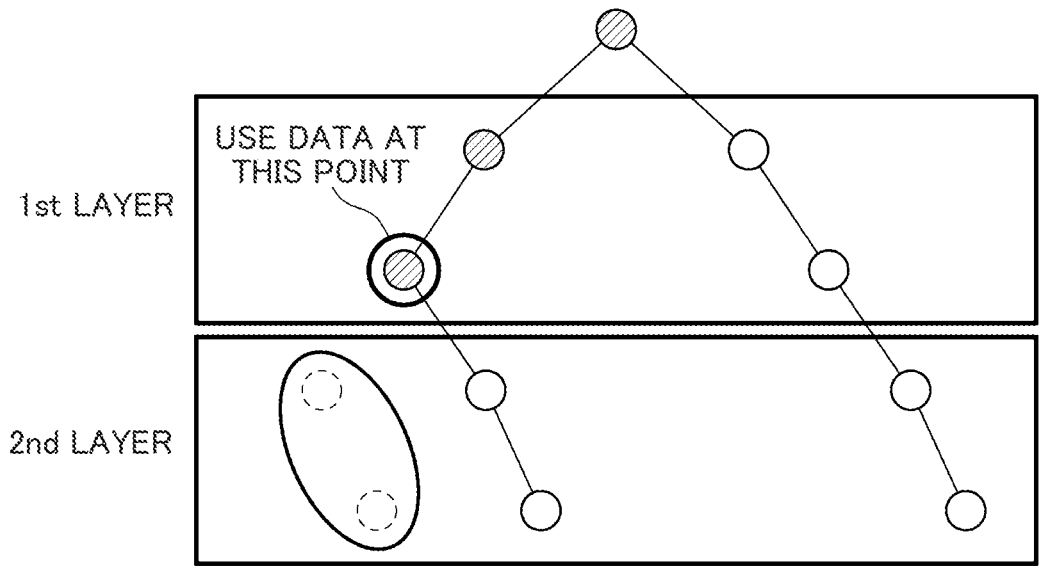
FIG. 24A is a description diagram in relation to a prediction using an end node, and is particularly a diagram illustrating a learned learning tree.
Figure 24B:
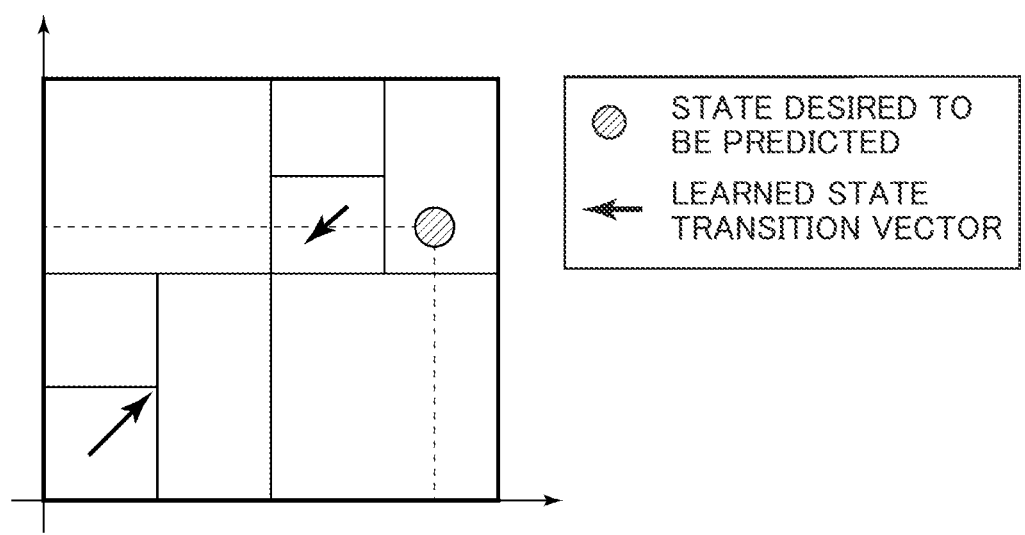
FIG. 24B is a description diagram in relation to a prediction using an end node, and is particularly a diagram illustrating represented state spaces.

FIG. 22B is a second example in relation to the specification of an output node. FIG. 22B illustrates nodes on a predetermined route having been specified so as to correspond to a predetermined input, and in the example of FIG. 22B as well, for the sake of convenience, a node A, a node B, and a node C are illustrated, just like in FIG. 22A. In the example of FIG. 22B, the node B is specified as a node for which a corresponding first error $E^1$ is minimal (S901); the node A and the node B are nodes for which the calculation can be appropriately made; and the node C is a node for which the calculation cannot be appropriately made. Under such conditions, when a node (the node C) that is located one node lower than a node (the node B) for which a corresponding first error $E^1$ is minimal is referred to (S902), the node C is a node for which the calculation cannot be appropriately made (S902 NO), the node (the node C) that is located one node lower than the node (the node B) for which a corresponding first error $E^1$ is minimal is specified as an output node (S904).

According to the above configuration, the generation of the prediction output can be performed by selecting a higher reliable node based on a reliability index having been obtained through learning processing and the possibility of appropriate calculation of the reliability index, and thus, more highly accurate prediction processing can be achieved.

Note that, in the present embodiment, attention is focused on initial learning stage exceptional processing that is also related to the calculation of the first errors $E^1$, and an example in which a determination as to whether a node of interest is a node for which the number of times of learnings is one or is a node for which the number of times of learnings is larger than or equal to two is employed as the criterion for the possibility of the appropriate calculation has been shown. But, the present invention is not limited to the above configuration. Thus, for example, there may be employed a process in which, when an error equivalent to a reliability index at a node cannot be determined, or the like, unless learnings whose execution number is larger than or equal to a predetermined number have been performed, that is, pieces of to-be-learned data (pieces of data for training) whose number is larger than or equal to the predetermined number have been stored, the relevant node is specified as a node for which the calculation cannot be appropriately made until the storage of the predetermined number of pieces of to-be-learned data, and upon storage of the predetermined number of pieces of to-be-learned data, the relevant node is specified as a node for which the calculation can be appropriately made. Further, in the present embodiment, there has been described the configuration in which the first errors $E^1$ are utilized, but the present invention is not limited to such a configuration. Thus, for example, other various kinds of errors equivalent to the reliability index can be utilized.

7. Others

7.1 Modification Examples

The present invention is not limited to the above-described embodiments, and various modifications can be made.

For example, in the above-described embodiments, the information processing device has been configured to perform both of the learning processing and the prediction processing, but the present invention is not limited to such a configuration. For example, the learning processing is performed in advance, and the information processing device may be configured as a device dedicated to prediction using learning parameters including various kinds of errors, such as an error $E^0$ and the like that have been acquired through the relevant learning processing. Alternatively, the information processing device may be configured as a device dedicated to learning, which, upon receipt of an input, performs only learning processing using various kinds of learning parameters.

Further, the information processing device may be installed at a server side in a predetermined server/client system, and may be configured to, in response to, for example, a request from a client device, perform prediction or learning processing on input data having been input from a client device via the communication unit 3 and the like, and output a prediction output for the input.

Moreover, in the above embodiments, it has been described that, in the calculation of an output, the method of adding and taking an arithmetic mean of state transition vectors that are outputs corresponding to pieces of previous learning data is employed. But, the output is not limited to the state transition vectors, and naturally, the calculation of the output may be made based on, for example, just the calculation of the arithmetic mean of output vectors or output values.

7.2 Application Examples

The present invention can be suitably applied to, for example, a dynamics-based learning/prediction system or the like. Further, the application range of the present invention is wide, and the present invention can be applied to learning/prediction in relation to other various kinds of systems, and to, for example, learning/prediction in relation to so-called big data. Examples of a learning/prediction target to which the present invention can be applied include, but are not limited to, financial data, such as information related to stock prices, financial credits, insurance services, and the like; medical data, such as medical receipts and the like; economic data, such as data related to the demands, supplies, and purchases of goods, the numbers of good deliveries, information related to the sending of direct mails, the numbers of visitors, the numbers of inquiries, and the like; data related to the Internet, such as buzzwords, information related to social media (social networking services), information related to IoT devices, information related to Internet securities, and the like; data related to weather; data related to real properties; data related to healthcare and a living body, such as heartbeats, blood pressure, and the like; data related to games; digital data related to moving images, still images, voices, and the like; and social infrastructure data, such as transportation data, electric power data, and the like.

INDUSTRIAL APPLICABILITY

The present invention can be applied to industry for production and any other activity related to, and any other field related to, an information processing device, an information processing program, and an IC chip that perform predetermined learning processing or generate a prediction output corresponding to predetermined input data based on the result of the relevant learning processing, particularly an information processing device, an information processing program, and an IC chip that perform learning/prediction processing using a learning tree structure.

REFERENCE SIGNS LIST 1 controller
2 I/O unit
3 communication unit
4 storage unit
10 information processing device

What is claimed is:

1. An information processing device configured to generate, by processor circuitry, a prediction output corresponding to input data, based on a learned model that is obtained by causing a learning model having a tree structure configured by a plurality of hierarchically arranged nodes each associated with a corresponding one of hierarchically divided state spaces to learn a predetermined set of pieces of data for learning, the information processing device comprising:
  input-node specification processor circuitry, based on the input data, configured to specify input nodes corresponding to the input data, wherein each of the input nodes is located on a corresponding one of layers from beginning to end of the learning tree structure;
  reliability-index acquisition processor circuitry configured to acquire a reliability index that is obtained through the learning a predetermined set of pieces of data for learning and indicates prediction accuracy;
  output-node specification processor circuitry, based on the reliability index acquired by the reliability-index acquisition processor circuitry, configured to specify, from the input nodes corresponding to the input data, an output node that is a basis of the generation of a prediction output; and
  prediction-output generation processor circuitry configured to generate a prediction output, based on the data for learning that is included in the state spaces that corresponds to the output node specified by the output-node specification processor circuitry, and
  wherein the reliability index comprises first errors each generated at a corresponding input node among the input nodes based on a difference between an output corresponding to the input data and a prediction output based on learned data included in the state spaces that corresponds to the corresponding input node, and,
  wherein the output-node specification processor circuitry is configured to specify, as the output node, a node which is among the input nodes and for which a corresponding first error among the first errors is minimal.

2. The information processing device according to claim 1, wherein the each first error is updated by performing a weighting addition using a forgetting coefficient α (0<α<1) on the each first error having been already obtained through the learning a predetermined set of pieces of data for learning and an absolute value of a difference between the output corresponding to the input data and a prediction output based on the learned data included in the state spaces that corresponds to the corresponding input node.

3. The information processing device according to claim 1,
  wherein the reliability index comprises an end prediction error obtained based on a difference between an output corresponding to the input data and a prediction output at an end node among the input nodes, and a second error that, based on first errors each generated at a corresponding input node among the input nodes based on a difference between the output corresponding to the input data and a prediction output based on the learned data included in the state spaces that corresponds to the corresponding input node, is generated based on a difference between the output corresponding to the input data and a prediction output at an input node which is among the input nodes and for which a corresponding first error among the first errors is minimal, and wherein the output-node specification processor circuitry is configured to make a comparison in a magnitude relation for the end prediction error and the second error, and specifies, as the output node, the input node for which the corresponding first error is minimal when the second error is smaller than the end prediction error, otherwise, specifies, as the output node, the end node among the input nodes.

4. The information processing device according to claim 1, wherein the reliability index is generated for each of the input nodes under a predetermined condition by referring to a prediction output at the each input node or a node among the input nodes that is located on a layer among the layers that is lower than the each input node, and wherein the output-node specification processor circuitry is configured to specify the output node based on the reliability index having been generated for the each input node.

5. The information processing device according to claim 4, wherein the reliability index comprises first errors each generated at a corresponding input node among the input nodes based on a difference between an output corresponding to the input data and a prediction output based on the learned data included in the state spaces that corresponds to the corresponding input node, and third errors each generated at a corresponding input node among the input nodes under a predetermined condition based on a difference between the output corresponding to the input data and a prediction output at an input node among the input nodes that is located on a layer among the layers that is lower than the corresponding input node, and wherein the output-node specification processor circuitry is sequentially configured to make a comparison in a magnitude relation, for each of the input nodes from a beginning node among the input nodes, for a corresponding first error among the first errors and a corresponding third error among the third errors, and specifies, as the output node, a node which is among the input nodes and for which a condition that the corresponding first error is smaller than the corresponding third error is satisfied.

6. The information processing device according to claim 4, wherein the reliability index comprises first errors each generated at a corresponding input node among the input nodes based on a difference between an output corresponding to the input data and a prediction output based on the learned data included in the state spaces that corresponds to the corresponding input node, fourth errors each generated at a corresponding input node among the input nodes under a predetermined condition by referring to a prediction output at the corresponding node or a node among the input nodes that is lower than the corresponding input node, and fifth errors each generated at a corresponding input node among the input nodes under a predetermined condition by referring to a prediction output at the corresponding input node or a node among the input nodes that is lower than the corresponding input node, wherein the output-node specification processor circuitry is sequentially configured to make a comparison in a magnitude relation, for each of the input nodes from a beginning node among the input nodes, for a corresponding fourth error among the fourth errors and a corresponding fifth error among the fifth errors, and when a condition in which the corresponding fourth error is smaller than the corresponding fifth error is satisfied, the output-node specification processor circuitry is configured to determine, as a node of interest, a node which is among the input nodes and for which a corresponding first error is smaller than any other first error among first errors at nodes that are among the input nodes and that are lower than or same as the node, while in contrast, when the condition is not satisfied, the output-node specification processor circuitry is configured to cause the comparison for the corresponding fourth error and the corresponding fifth error to sequentially proceed to a node among the input nodes that is located on a lower layer among the layers until the condition in which the corresponding fourth error is smaller than the corresponding fifth error is satisfied, wherein the output-node specification processor circuitry is configured to determine, for the node of interest, whether or not a condition that a corresponding fourth error among the fourth errors is smaller than a corresponding fifth error among the fifth errors is satisfied, and when the condition is satisfied, the output-node specification processor circuitry is configured to specify the node of interest as the output node, while in contrast, when the condition is not satisfied, the output-node specification processor circuitry is configured to cause the comparison for the corresponding fourth error and the corresponding fifth error to sequentially proceed to a node among the input nodes that is located on a lower layer among the layers until the condition in which the corresponding fourth error is smaller than the corresponding fifth error is satisfied, and wherein, when there does not exist any node for which the condition that the corresponding fourth error is smaller than the corresponding fifth error is satisfied until an arrival at a node among the input nodes that is one layer higher than the end node, the output-node specification processor circuitry is configured to specify the end node as the output node.

7. The information processing device according to claim 1, wherein, when a number of times of learnings of a respective node of the input nodes is larger than or equal to a predetermined number, the reliability index of the node is calculated using a past reliability index of the respective node, and when a number of times of learnings of the respective node is smaller than the predetermined number, the reliability index of the respective node is a defined value, and wherein the output-node specification processor circuitry comprises a highly reliable node specification processor circuitry, based on the reliability index acquired by the reliability index acquisition processor circuitry, configured to select a highly reliable node having highest reliability from among the input nodes corresponding to the input node, a calculation possibility determination processor circuitry configured to determine whether or not a node among the input nodes that is located on a layer among the layers that is one layer lower than the highly reliable node is a node for which a calculation is possible, wherein when the number of times of learnings corresponding to the node that is located on the layer one layer lower than the highly reliable node is larger than or equal to the predetermined number, it is determined that the calculation is possible, and when the number of times of learnings corresponding to the node that is located on the layer one layer lower than the highly reliable node is smaller than the predetermined number, it is determined that the calculation is not possible, and selective output-node specification processor circuitry configured to specify the highly reliable node as the output node that is the basis of the generation of the prediction output when the node that is located on the layer one layer lower than the highly reliable node is the node for which the calculation is possible, and specifies the node that is located on the layer one layer lower than the highly reliable node as the output node that is the basis of the generation of the prediction output when, in contrast, the node that is located on the layer one layer lower than the highly reliable node is not the node for which the calculation is possible.

8. The information processing device according to claim 7, wherein the predetermined number is two.

9. An information processing device configured to perform predetermined learning processing, based on a learning model having a tree structure configured by a plurality of hierarchically arranged nodes each associated with a corresponding one of hierarchically divided state spaces, the information processing device comprising:

input-node specification processor circuitry, based on the input data, configured to specify input nodes corresponding to the input data, wherein each of the input nodes is located on a corresponding one of layers from beginning to end of the learning tree structure; and reliability-index updating processor circuitry, at each of the input nodes, configured to gradually update a reliability index indicating prediction accuracy based on a difference between an output based on the input data and a prediction output based on previously obtained data, and wherein the reliability index comprises first errors each generated at a corresponding input node among the input nodes based on a difference between an output corresponding to the input data and a prediction output based on learned data included in the state spaces that corresponds to the corresponding input node, and, wherein the output-node specification processor circuitry is configured to specify, as the output node, a node which is among the input nodes and for which a corresponding first error among the first errors is minimal.

10. An IC chip configured to generate a prediction output corresponding to input data based on a learned model that is obtained by causing a learning model having a tree structure configured by a plurality of hierarchically arranged nodes each associated with a corresponding one of hierarchically divided state spaces to learn a predetermined set of pieces of data for learning, the IC chip comprising:

an input terminal to which the input data is input;

input-node specification processor circuitry, based on the input data obtained through the input terminal, configured to specify input nodes corresponding to the input data, wherein each of the input nodes is located on a corresponding one of layers from beginning to end of the learning tree structure;

reliability-index acquisition processor circuitry configured to acquire a reliability index that is obtained through the learning a predetermined set of pieces of data for learning and indicate prediction accuracy;

output-node specification processor circuitry, based on the reliability index acquired by the reliability-index acquisition processor circuitry, configured to specify, from the input nodes corresponding to the input data, an output node that is a basis of the generation of a prediction output;

prediction-output generation processor circuitry configured to generate a prediction output based on the data for learning that is included in the state spaces that corresponds to the output node specified by the output-node specification processor circuitry; and an output terminal from which the prediction output is output, and wherein the reliability index comprises first errors each generated at a corresponding input node among the input nodes based on a difference between an output corresponding to the input data and a prediction output based on learned data included in the state spaces that corresponds to the corresponding input node, and, wherein the output-node specification processor circuitry specifies, as the output node, a node which is among the input nodes and for which a corresponding first error among the first errors is minimal.

* * * * *